United States Patent
Grossman et al.

(10) Patent No.: US 10,410,396 B2
(45) Date of Patent: *Sep. 10, 2019

(54) ANIMATING SKETCHES VIA KINETIC TEXTURES

(71) Applicant: AUTODESK, INC., San Rafael, CA (US)

(72) Inventors: Tovi Grossman, Toronto (CA); George Fitzmaurice, Toronto (CA); Rubaiat Habib Kazi, Toronto (CA); Fanny Chevalier, Lille (FR); Shengdong Zhao, Singapore (SG)

(73) Assignee: AUTODESK, INC., San Rafael, CA (US)

(*) Notice: Subject to any disclaimer, the term of this patent is extended or adjusted under 35 U.S.C. 154(b) by 46 days.

This patent is subject to a terminal disclaimer.

(21) Appl. No.: 15/676,950

(22) Filed: Aug. 14, 2017

(65) Prior Publication Data

US 2017/0345202 A1    Nov. 30, 2017

Related U.S. Application Data

(63) Continuation of application No. 14/549,317, filed on Nov. 20, 2014, now Pat. No. 9,734,618.

(60) Provisional application No. 61/908,609, filed on Nov. 25, 2013.

(51) Int. Cl.
*G06T 15/00* (2011.01)
*G06T 13/80* (2011.01)

(52) U.S. Cl.
CPC .......... *G06T 13/80* (2013.01); *G06T 2213/08* (2013.01)

(58) Field of Classification Search
CPC ............................ G06T 2213/08; G06T 13/80
USPC ......................................................... 345/418
See application file for complete search history.

(56) References Cited

U.S. PATENT DOCUMENTS

| 8,448,090 B2 | 5/2013 | Van Der Meulen et al. |
| 8,577,659 B2 | 11/2013 | Kim et al. |
| 9,070,207 B2 | 6/2015 | Yomdin et al. |
| 9,396,580 B1 | 7/2016 | Nowrouzezahrai et al. |

(Continued)

OTHER PUBLICATIONS

Kazi, R.H., Igarashi, T., Zhao, S. and Davis, R., May 2012. Vignette: interactive texture design and manipulation with freeform gestures for pen-and-ink illustration. In Proceedings of the SIGCHI Conference on Human Factors in Computing Systems (pp. 1727-1736). ACM.*

(Continued)

*Primary Examiner* — Phu K Nguyen
(74) *Attorney, Agent, or Firm* — Artegis Law Group, LLP

(57) ABSTRACT

A sketch-based interface within an animation engine provides an end-user with tools for creating emitter textures and oscillator textures. The end-user may create an emitter texture by sketching one or more patch elements and then sketching an emitter. The animation engine animates the sketch by generating a stream of patch elements that emanate from the emitter. The end-user may create an oscillator texture by sketching a patch that includes one or more patch elements, and then sketching a brush skeleton and an oscillation skeleton. The animation engine replicates the patch along the brush skeleton, and then interpolates the replicated patches between the brush skeleton and the oscillation skeleton, thereby causing those replicated patches to periodically oscillate between the two skeletons.

21 Claims, 20 Drawing Sheets

(56) References Cited

U.S. PATENT DOCUMENTS 9,734,618 B2* 8/2017 Grossman ............... G06T 13/80
2006/0001667 A1 1/2006 LaViola

OTHER PUBLICATIONS

Baudisch, et al., "Phosphor: Explaining Transitions in the User Interface Using Afterglow Effects", ACM UIST, Oct. 15-18, 2006, pp. 169-174.
Buxton, "Sketching User Experiences: Getting the Design Right and the Right Design", Morgan Kaufmann, 2007, 19 pages.
Chen, et al., "Interactive Procedural Street Modeling", ACM SIGGRAPH, Art. 103, 2008, 10 pages.
Chuang, et al., "Animating Pictures with Stochastic Motion Textures", ACM SIGGRAPH, Art. 853, 2005, 8 pages.
Cho, et al. Anyone can cook: Inside Ratatouille's Kitchen, 2007, SIGGRAPH Courses, 58 pages.
Davis, et al., "Informal Animation Sketching: Requirements and Design", AAAI, 2004, 7 pages.
Davis, et al., "K-Sketch: A Kinetic Sketch Pad for Novice Animators", ACM, CHI Apr. 5-10, 2008, 10 pages.
Fernquist, et al., "Sketch-Sketch Revolution: An Engaging Tutorial System for Guided Sketching and Application Learning", ACM, UIST Oct. 16-19, 2011, pp. 373-382.
Heiser, et al., "Arrows in Comprehending and Producing Mechanical Diagrams", Cognitive Science 30, 2006, pp. 581-592.
Igarashi, et al., "As-Rigid-As-Possible Shape Manipulation", ACM Transactions on Graphics, Jul. 2005, vol. 24, Issue 3, pp. 1134-1141.
Joshi, et al., "Cliplets: Juxtaposing Still and Dynamic Imagery", ACM, UIST Oct. 7-10, 2012, 10 pages.
Kazi, et al., "Draco: Bringing Life to Illustrations with Kinetic Textures", ACM, SIGCHI Conference on Human Factors in Computing Systems, Apr. 26-May 1, 2014, 10 pages.
Kazi, et al., "Vignette: Interactive Texture Design and Manipulation with Freeform Gestures for Pen-and-Ink Illustration", ACM, CHI, 2012, pp. 1727-1736.
Landay, et al., "Sketching Interfaces: Toward More Human Interface Design", IEEE Computer, Mar. 2001, 34(3) pp. 56-64.
Ma, et al., "Dynamic Element Textures", ACM SIGGRAPH, Art. 90, 2013, 10 pages.
McCloud, "Understanding Comics: The Invisible Art", Tundra Publishing Ltd, 1993, 223 pages.
Moscovich, "Animation Sketching: An Approach to Accessible Animation", Brown University, 2001, 2 pages.
Narain, et al., "Aggregate Dynamics for Dense Crowd Simulation", ACM Transactions on Graphics, 2009, 28(5): 8 pages.
Parent, "Computer Animation—Algorithms and Techniques", (3rd Ed) Chapter 5. Morgan Kaufmann, 2012, 269 pages.
Popović, et al., "Motion Sketching for Control of Rigid-Body Simulations", ACM Transactions on Graphics, vol. 22, No. 4, Oct. 2003, pp. 1034-1054.
Reeves, "Particle systems—A Technique for Modeling a Class of Fuzzy Objects", ACM Transactions on Graphics, vol. 17, No. 3, Apr. 1983, pp. 359-375.
Reynolds, et al., "Flocks, Herds and Schools: A Distributed Behavioral Model", ACM Transactions on Graphics, vol. 21, No. 4, Jul. 1987, pp. 25-34.
Santosa, et al., "Direct Space-Time Trajectory Control for Visual Media Editing", ACM CHI, Apr. 27-May 2, 2013, pp. 1149-1158.
Schödl, et al., "Video Textures", ACM SIGGRAPH, 2000, pp. 489-498.
Sewall, et al., "Interactive Hybrid Simulation of Large-Scale Traffic", ACM Transactions on Graphics, vol. 30, No. 6, Art. 135, 2011, 18 pages.
Stam, "Stochastic Dynamics: Simulating the Effects of Turbulence on Flexible Structures", Eurographics, vol. 16, No. 3, 1997, 6 pages.
Thorne, et al., "Motion Doodles: An Interface for Sketching Character Motion", ACM Transactions on Graphics, vol. 23, No. 3, 2004, 8 pages.
Victor, "Inventing on Principles", CUSE, Feb. 2012, 13 pages.
Zhu, et al., "Sketch-based Dynamic Illustration of Fluid Systems", ACM Transactions on Graphics, vol. 30, No. 6, Article 134, 2011, pp. 134:1-134:8.
Non-Final Office Action for U.S. Appl. No. 14/553,958, dated Jun. 2, 2016.

* cited by examiner

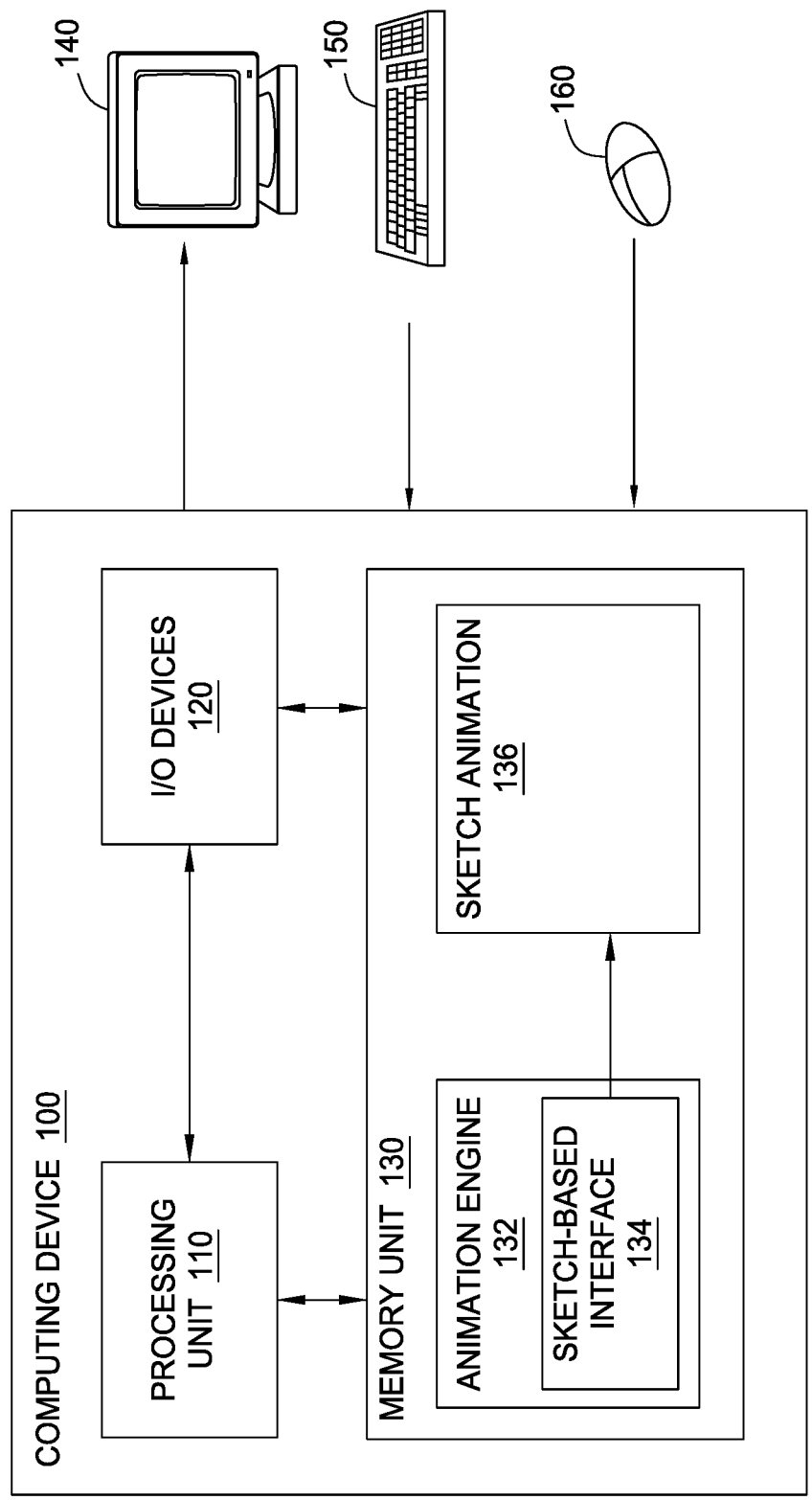

ANIMATING SKETCHES VIA KINETIC TEXTURES

CROSS-REFERENCE TO RELATED APPLICATIONS

This application is a continuation of the U.S. patent application titled, "ANIMATING SKETCHES VIA KINETIC TEXTURES," filed on Nov. 20, 2014 and having Ser. No. 14/549,317, which claims the benefit of U.S. provisional patent application titled "Kinetic Textures," filed on Nov. 25, 2013 and having Ser. No. 61/908,609. The subject matter of these related applications is hereby incorporated herein by reference.

BACKGROUND OF THE INVENTION

Field of the Invention

Embodiments of the present invention relates generally to computer science and, more specifically, to animating sketches via kinetic textures.

Description of the Related Art

A wide variety of computer animation software applications currently exist that provide artists, animators, and casual users alike with tools for generating animations. For example, a conventional animation application could provide a user with drawings tools for sketching individual frames of an animation. Once the user has sketched each frame of the animation, the animation application strings the frames together into an animated movie.

However, one problem with the animation application mentioned above is that animations composed of a large number of moving objects can be tedious and time-consuming to prepare. For example, for each different frame of the animation, the user typically must redraw each individual moving object, with only slight differences in position or orientation. Further, the user must draw many such frames to produce a smooth-looking animation. Although other specialized tools exist beyond frame-to-frame techniques, these tools generally provide exceedingly complex interfaces that may not be conducive to the rapid generation of animations.

As the foregoing illustrates, what is needed in the art is a more effective approach to generating animated sketches.

SUMMARY OF THE INVENTION

One embodiment of the present invention sets forth a computer-implemented method for generating an animation, including generating a first sketch element within a sketch animation, where the sketch animation includes one or more static line drawings, generating an emitter element within the sketch animation, where the emitter element includes at least one line segment or point, causing the first sketch element to move from a first position within the sketch animation to a second position within the sketch animation, thereby causing the first sketch element to traverse a first portion of the sketch animation, and rendering the sketch animation for display on a display device as the first sketch element traverses the first portion of the sketch animation.

At least one advantage of the disclosed technique is that the end-user may create sketch animations via an intuitive interface that does not require each individual frame of the animation to be drawn. Accordingly, the sketch-based interface described herein facilitates faster generation of sketch animations.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a computing device 100 configured to implement one or more aspects of the present invention;

DETAILED DESCRIPTION

Figure 2A:
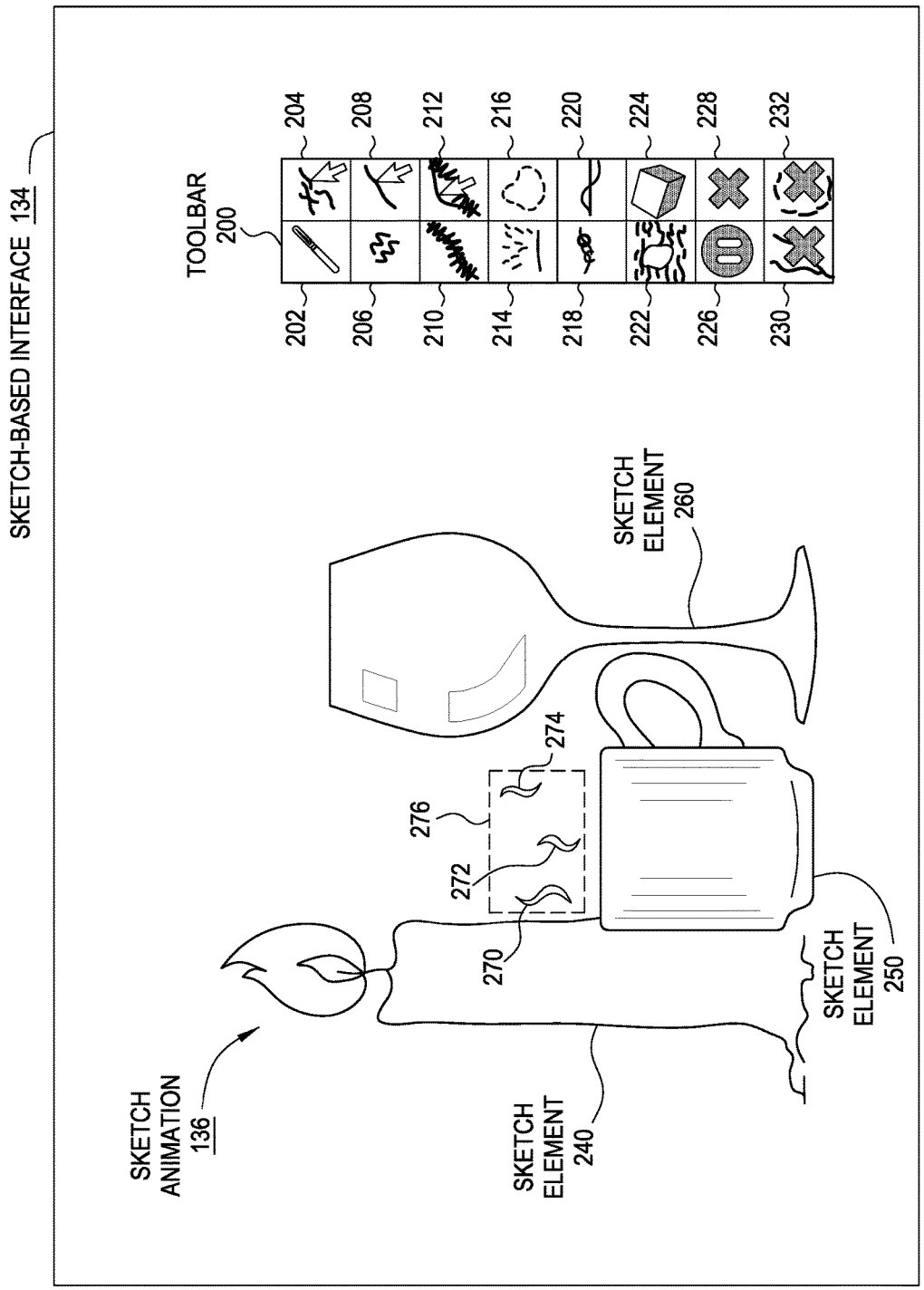
FIGS. 2A-2C illustrate the sketch-based interface of FIG. 1 configured to generate a sketch animation that includes emitted streams of replicated patch elements, according to one embodiment of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

FIG. 1 illustrates a computing device configured to implement one or more aspects of the present invention. As shown, computing device 100 includes a processing unit 110, input/output (I/O) devices 120, and a memory unit 130 coupled together. Memory unit 130 includes an animation engine 132 that includes a sketch-based interface 134. Animation engine 132 is configured to generate sketch animation 136 based on input received from an end-user via sketch-based interface 134. Computing device 100 is coupled to a display device 140, a keyboard 150, and a mouse 160. Display device 140 is configured to display sketch-based interface 134 to the end-user. Keyboard 150 and mouse 160 are configured to receive input from the end-user. In one embodiment, a touch screen may implement the functionality of display device 140, keyboard 150, and mouse 160.

Processing unit 110 may be any technically feasible unit configured to process data and execute software applications, including a central processing unit (CPU), a graphics processing unit (GPU), a CPU coupled to a GPU, and so forth. I/O devices 120 may include any technically feasible device configured to receive input, generate output, or both receive input and generate output. For example, I/O devices could include keyboard 150, mouse 160, a stylus, or other devices configured to receive input. I/O devices 120 could also include display device 140, a speaker, or other devices configured to generate output. I/O devices 120 could also include a touchscreen or other devices configured to both receive input and generate output. Memory unit 130 may be any technically feasible data storage device or collection of such devices, including a hard disk, a random access memory (RAM) module, a flash drive, and so forth.

Animation engine 132 is a software application that, when executed by processing unit 110, generates sketch-based interface 134 and displays that interface to the end-user via display device 140. Sketch-based interface 134 is a graphical user interface (GUI) that exposes a collection of sketch and animation tools to the end-user. Those tools allow the end-user to create sketch animation 136. Sketch animation 136 generally includes a set of line drawings that can be animated. Specifically, the end-user may generate a static sketch via the sketch tools provided by sketch-based interface 134, and then animate that sketch via the animation tools provided by sketch-based interface 134. The end-user may manipulate the sketch tools and animation tools by interacting with keyboard 150, mouse 160, and other input devices. Animation engine 132 may then display sketch animation 136 to the end-user via display device 140.

The animation tools provided by sketch-based interface 134 allow the creation of "kinetic textures." Kinetic textures are types of animations that fall into two categories, emitter textures (or "emitting textures") and oscillator textures (or "oscillating textures"). Emitter textures animate a sketch by generating streams of emitted elements within the sketch. For example, the end-user may implement an emitter texture to animate a school of fish swimming across sketch animation 136, a person blowing bubbles that traverse sketch animation 136, a stream flowing across sketch animation 136, and so forth. Emitter textures are described in greater detail below in conjunction with FIGS. 2A-7.

Oscillator textures can be used to animate a sketch by causing elements of the sketch to oscillate between different boundaries. For example, the end-user may implement an oscillator texture to animate a swaying plant within sketch animation 136, the rolling surface of a liquid, a breathing animal, and so forth. Oscillator textures are described in greater detail below in conjunction with FIGS. 8A-10.

Emitter Textures

Figure 2B:
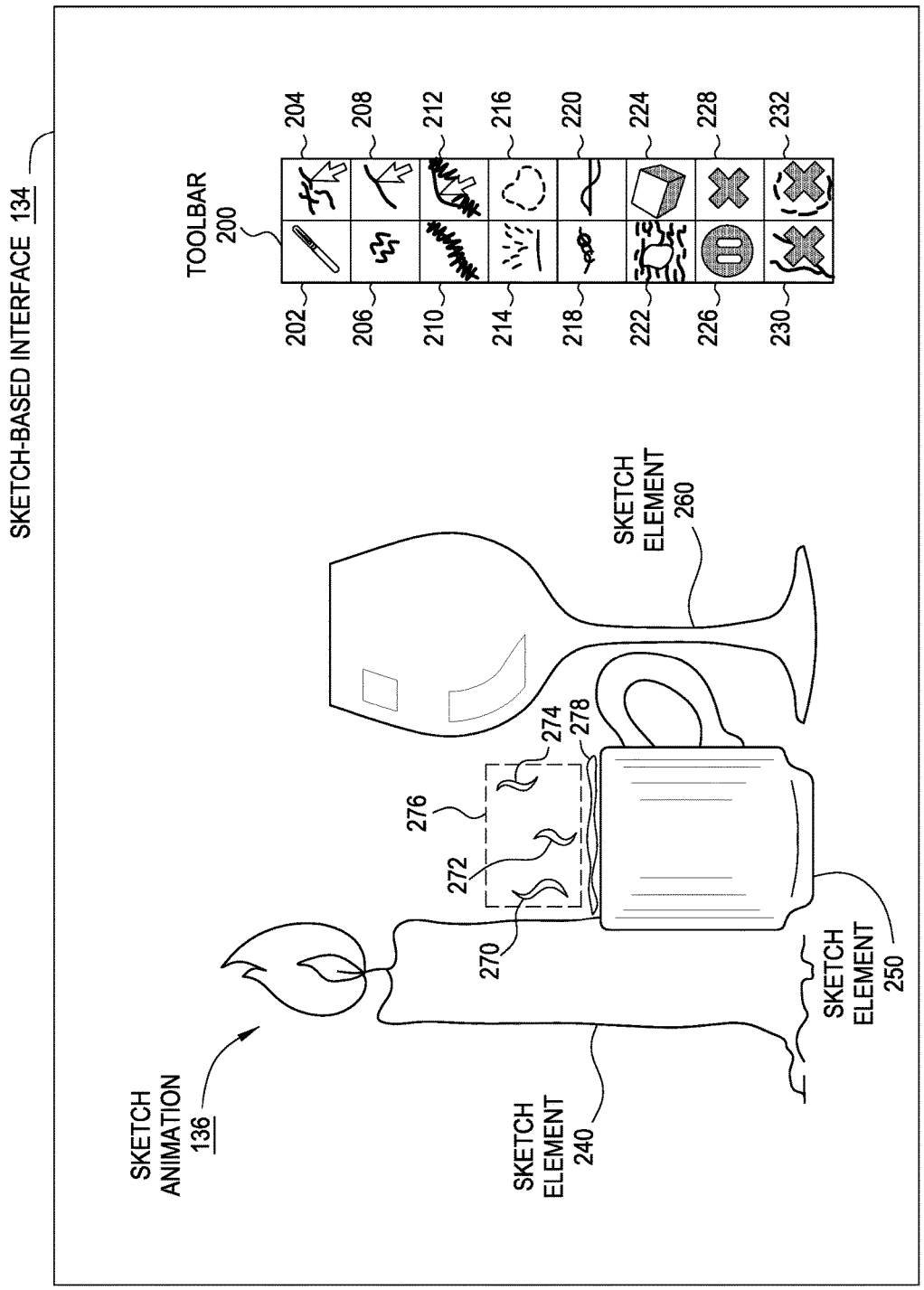
Figure 2C:
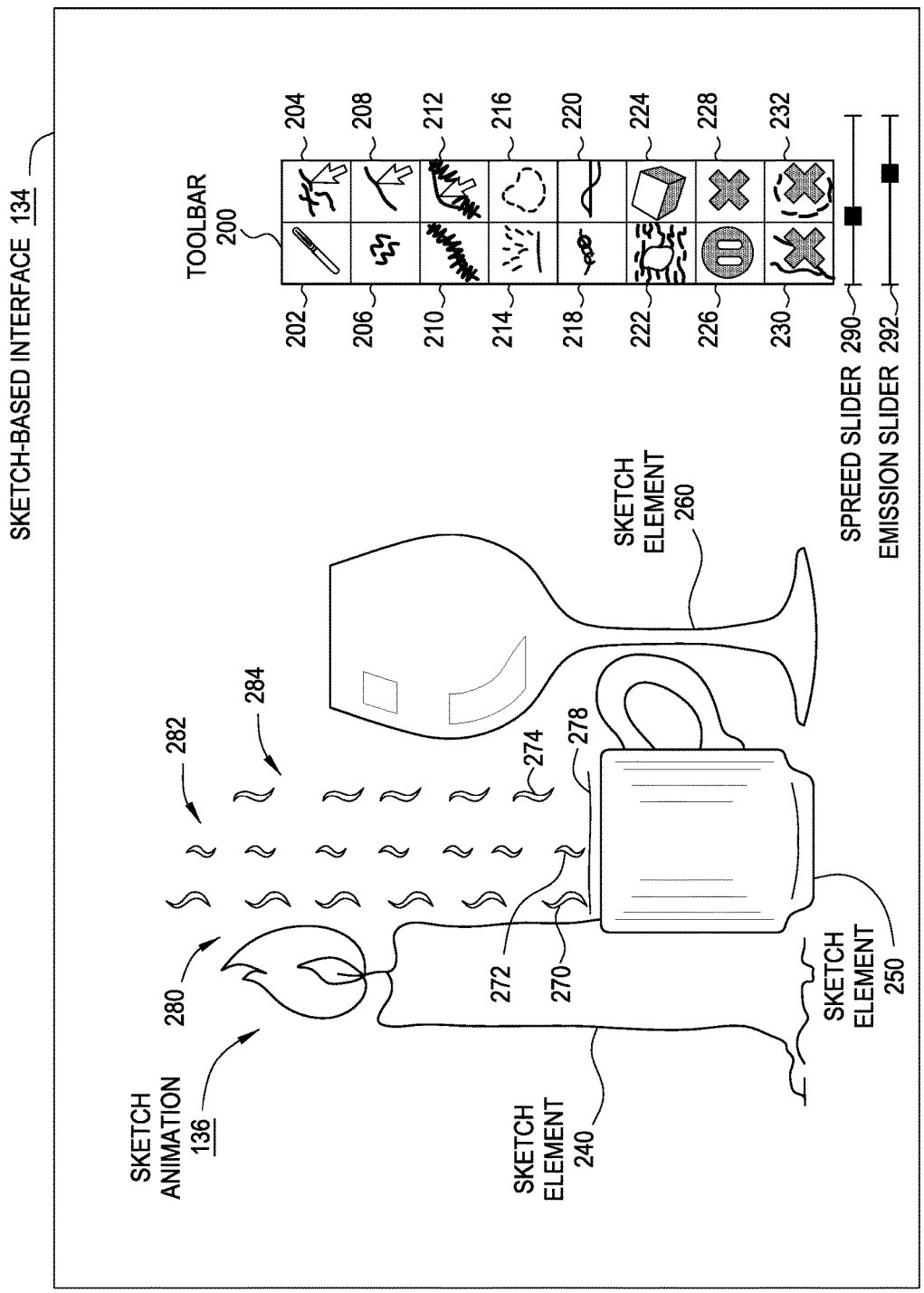

FIGS. 2A-2C illustrate the sketch-based interface of FIG. 1 configured to generate a sketch animation that includes emitted streams of replicated patch elements, according to one embodiment of the present invention. As shown in FIG. 2A, sketch interface 134 exposes toolbar 200 to the end-user for generating sketch animation 136. Toolbar 200 includes a static ink tool 202, a static ink erase tool 204, a patch element tool 206, a texture select tool 208, a brush skeleton tool 210, an oscillation skeleton tool 212, an emitter tool 214, a texture outline tool 216, a motion path tool 218, a motion profile tool 220, a mask tool 222, a perspective tool 224, a play/pause button 226, a remove texture tool 228, a remove motion tool 230, and a remove mask tool 232. Animation engine 132 is configured to generate sketch-based interface 134 and display that interface, along with sketch animation 136, to the end-user via display device 140. The end-user may use the tools shown in toolbar 200 by inputting commands via keyboard 150 and/or mouse 160.

Static ink tool 202 allows the end-user to draw static lines with various attributes within sketch animation 136, including various colors, thicknesses, patterns, and so forth. Static ink erase tool 204 allows the end-user to erase lines drawn with static ink tool 202. The end-user may use static ink tool 202 and static ink erase tool 204 to draw sketch elements 240, 250, and 260. In FIG. 2A, sketch element 240 represents a candle, sketch element 250 represents a mug, and sketch element 260 represents a glass.

Patch element tool 206 allows the end-user to draw "patch elements," such as patch elements 270, 272, and 274. Patch elements are sketch elements that can be animated, and may have similar attributes as sketch elements. Patch elements 270, 272, and 274 collectively define a patch 276. Patch 276 may be selected using texture select tool 208. Patch elements 270, 272, and 264 within patch 276 may be animated using emitter tool 214, as shown in FIG. 2B.

In FIG. 2B, sketch animation 136 includes an emitter 278. Emitter 278 is a line drawing. The end-user may draw emitter 278 using emitter tool 214. When emitter 278 is drawn, animation engine 132 identifies patch elements 270, 272, and 274 within patch 276 and then animates those patch elements. In doing so, animation engine 132 generates emitted streams of replicated patch elements that appear to emanate from emitter 278 and traverse sketch animation 136, as shown in FIG. 2C.

In FIG. 2C, animation engine 132 generates emitted streams 280, 282, and 284 that include replicated versions of patch elements 270, 272, and 274, respectively. The replicated patch elements within emitted streams 280, 282, and 284 travel from emitter 278 towards the top of sketch animation 136. Accordingly, emitted streams 280, 282, and 284 may visually appear as steam wafting from a mug. The end-user may control the speed at which the replicated patch elements within emitted streams 280, 282, and 284 move by adjusting speed slider 290. The end-user may also control the frequency with which emitter 278 emits the replicated patch elements by adjusting emission slider 280. To remove the kinetic texture associated with patch 276 and emitter 278, the end-user may select and delete those elements via texture remove tool 228. The end-user may also adjust the granular motion of the replicated patch elements within emitted streams 280, 282, and 284, as described in greater detail below in conjunction with FIGS. 3A-3B.

Figure 3A:
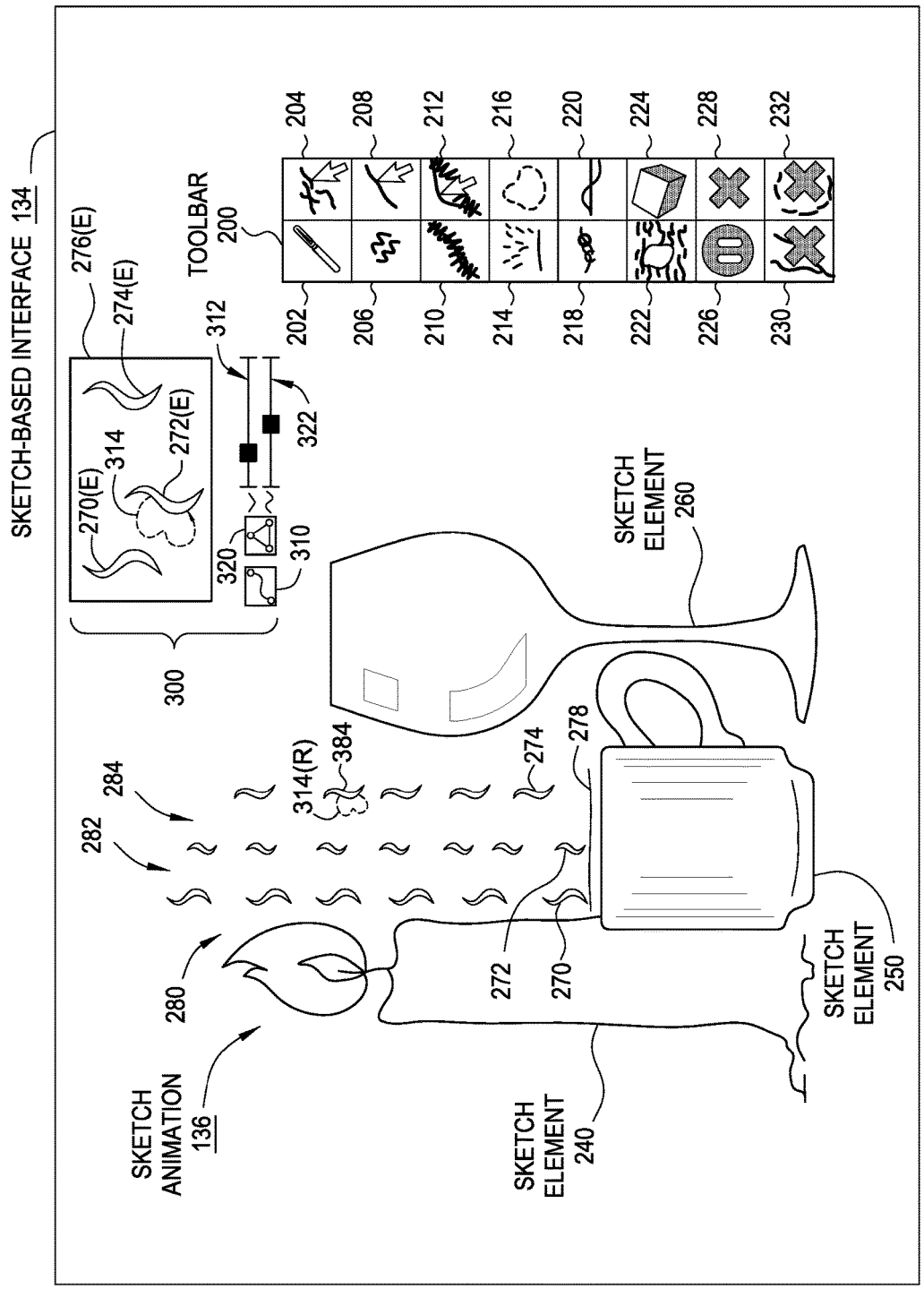
FIGS. 3A-3B illustrate the sketch-based interface of FIG. 1 configured to adjust the granular motion of replicated patch elements within emitted streams of replicated patch elements, according to one embodiment of the present invention.
Figure 3B:
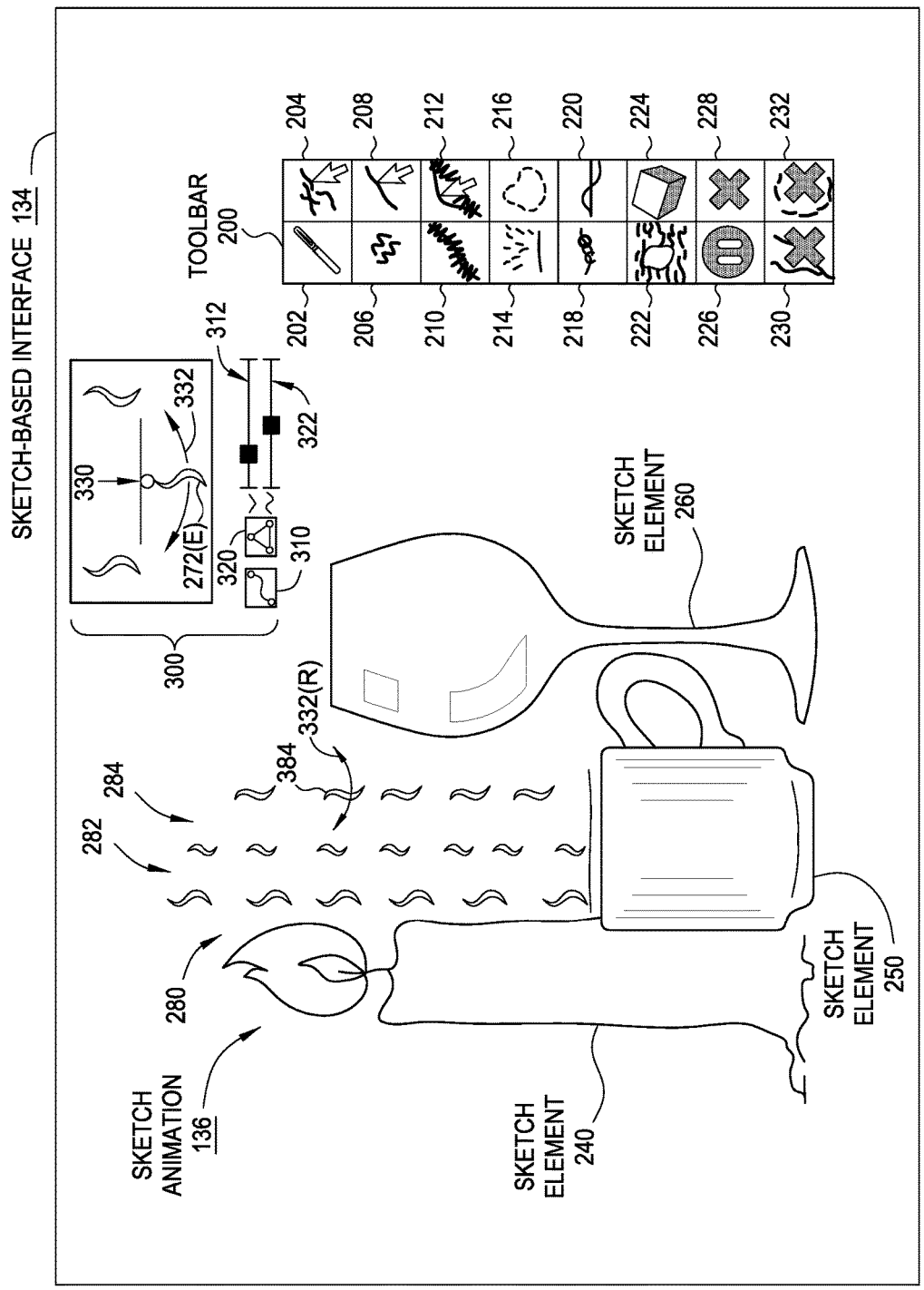

FIGS. 3A-3B illustrate sketch-based interface 134 of FIG. 1 configured to adjust the granular motion of replicated patch elements within emitted streams 280, 282, and 284 of FIGS. 2A-2C, according to one embodiment of the present invention. As shown in FIG. 3A, sketch-based interface 134 includes a granular motion interface 300. Granular motion interface 300 is a widget that allows the end-user to adjust the dynamics of each replicated patch element within emitted streams 280, 282, and 284. Granular motion interface 300 displays patch elements 270(E), 272(E), and 274(E), which generally appear as expanded versions of patch elements 270, 272, and 274, respectively. Granular motion interface 300 also includes a translation mode button 310 and corresponding translation speed slider 312, as described in greater detail below, and a rotation mode button 320 and corresponding rotation speed slider 322, as described in greater detail below in conjunction with FIG. 3B.

When the end-user selects translation mode button 310, granular motion interface 300 allows the end-user to drag one of patch elements 270(E), 272(E), or 274(E) within granular motion interface 300. Animation engine 132 records the path traced when the patch element is dragged. Animation engine 100 then causes each replicated path element within emitted streams 280, 282, and 284 to follow that path during animation. The resulting animation is thus a combination of global motion and granular motion.

For example, in FIG. 3A, the end-user may drag patch element 272(E) along path 314, and animation engine 132 may then cause the replicated patch elements within each of emitted streams 280, 282, and 284 to trace that path during emission. As is shown, a replicated patch element 384 follows path 314(R). Translation speed slider 312 allows the end-user to control the speed with which each replicated patch element translates along the recorded path. In practice, animation engine may apply any translation paths input into granular motion interface 300 to any and all replicated patch elements associated with patch 276, beyond replicated patch element 384.

Referring now to FIG. 3B, when the end-user selects rotation mode button 320, granular motion interface 300 allows the end-user to rotate one of patch elements 270(E), 272(E), or 274(E) within granular motion interface 300 relative to a pivot point. Animation engine 132 records the rotation of the patch element and then causes each replicated patch element within emitted streams 280, 282, and 284 to rotate in like fashion.

For example, the end-user may rotate patch element 272(E) relative to pivot point 330. Animation engine 132 records rotation 332, and then applies that rotation to each of the replicated patch elements within emitted streams 280, 282, and 284. As is shown, animation engine 132 applies rotation 332(R) to replicated patch element 384. Rotation speed slider 322 allows the end-user to control the speed with which each replicated patch element rotates. In practice, animation engine may apply any rotation modifications input into granular motion interface 300 to any and all replicated patch elements associated with patch 276, beyond replicated patch element 384.

Referring generally to FIGS. 3A-3B, granular motion interface 300 allows the end-user to adjust the animation of each replicated patch element within an emitted stream, thereby allowing the end-user to fine-tune that stream. Sketch-based interface 134 also allows the end-user to adjust the trajectories followed by the replicated patch elements within emitted streams, as discussed in greater detail below in conjunction with FIGS. 4A-4B.

Figure 4A:
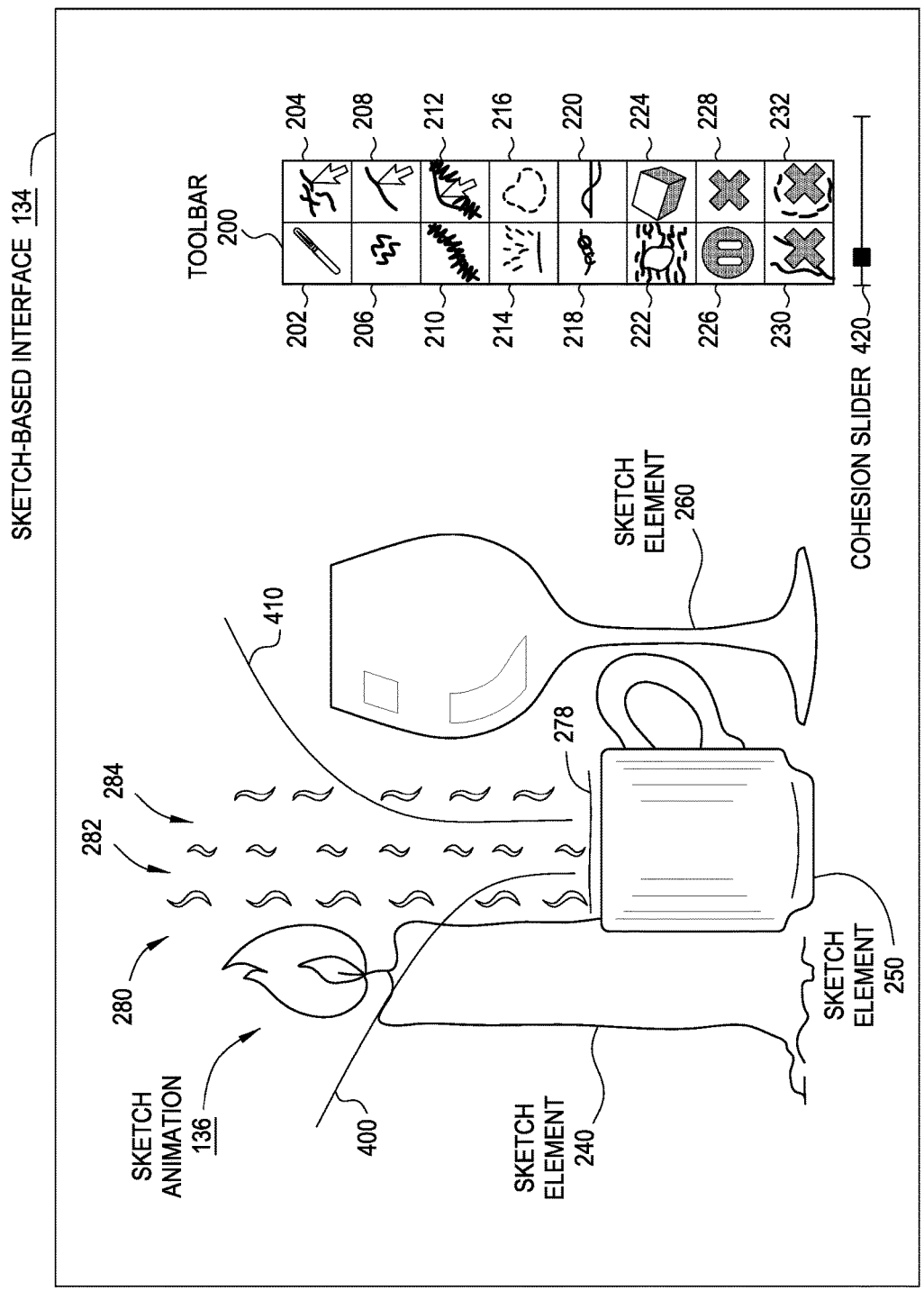
FIGS. 4A-4B illustrate the sketch-based interface of FIG. 1 configured to adjust one or more trajectories associated with emitted streams of patch elements, according to one embodiment of the present invention.
Figure 4B:
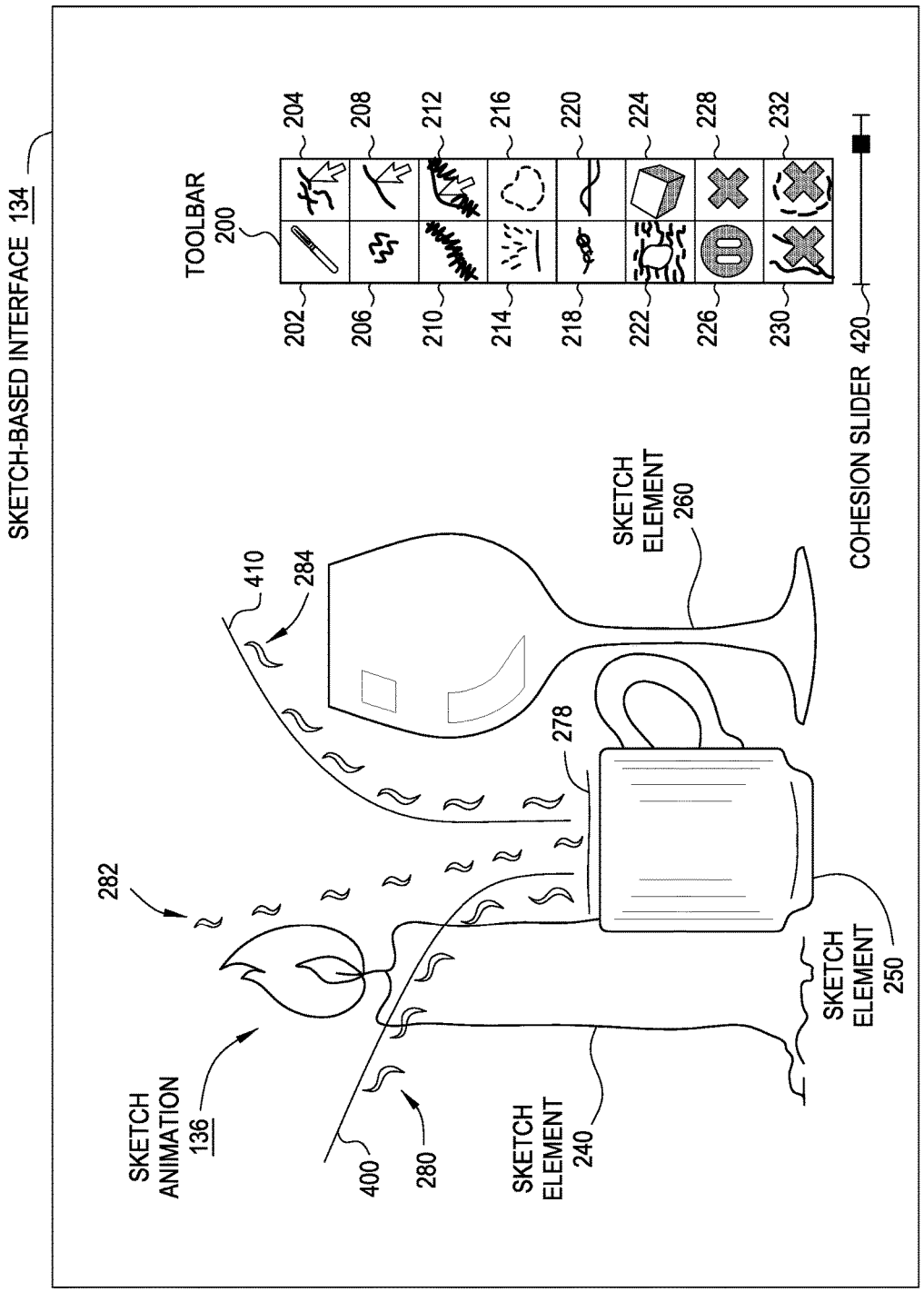

FIGS. 4A-4B illustrate sketch-based interface 134 of FIG. 1 configured to adjust one or more trajectories associated with emitted streams 280, 282, and 284, according to one embodiment of the present invention. As shown in FIG. 4A, sketch animation 136 includes motion guidelines 400 and 410. The end-user of sketch-based interface 134 may draw motion guidelines 400 and 410 within sketch animation 136 using motion path tool 218 in order to change the trajectories of replicated patch elements within emitted streams 280, 282, and 284, as shown in FIG. 4B.

In FIG. 4B, animation engine 132 adjusts the trajectories of emitted streams 280, 282, and 284 within sketch-based interface 134 to more closely follow motion guidelines 400 and 410. In one embodiment, animation engine 132 adjusts a velocity vector associated with each replicated patch element within the different emitted streams based on motion guidelines 400 and 410. With this approach, the end-user may control the path that replicated elements follow when traversing sketch animation 136. To remove motion guidelines 400 and 410, the end-user may use remove motion tool 230. The end-user may also obscure different parts of sketch animation 136 so that replicated patch elements do not appear in the obscured regions, as described in greater detail below in conjunction with FIGS. 5A-5B.

Figure 5A:
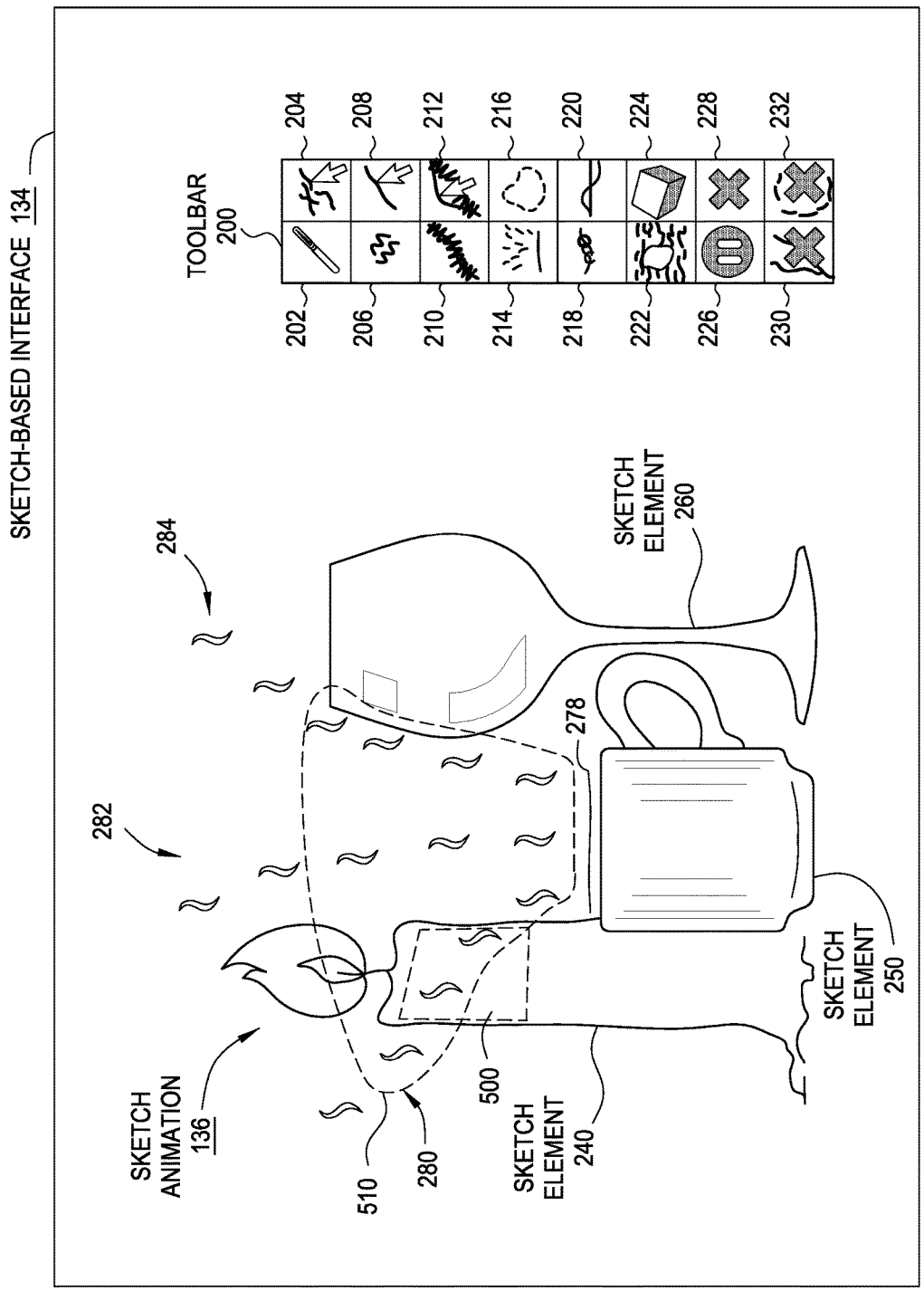
FIGS. 5A-5B illustrate the sketch-based interface of FIG. 1 configured to obscure different portions of emitted streams of replicated patch elements, according to one embodiment of the present invention.
Figure 5B:
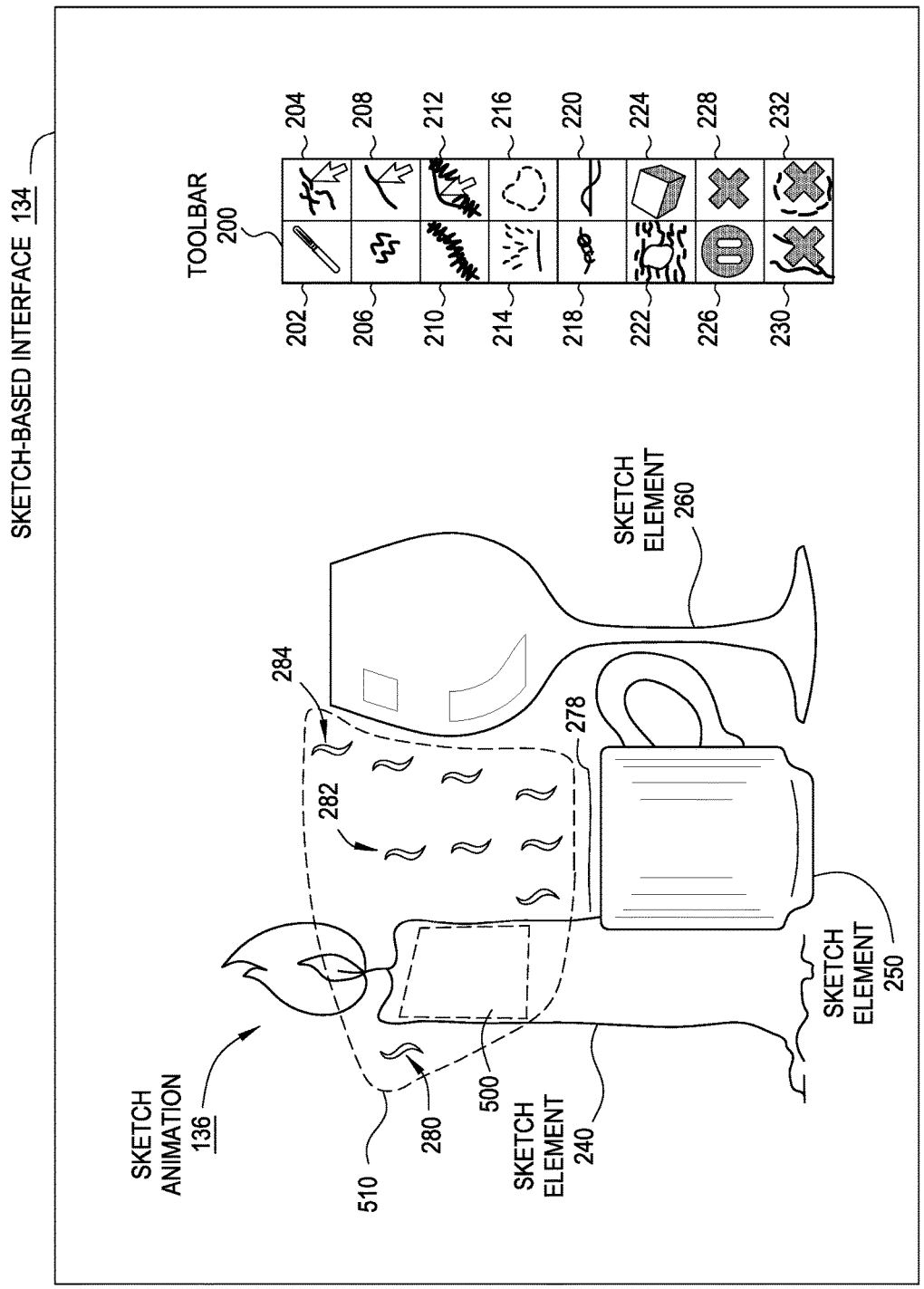

FIGS. 5A-5B illustrate sketch-based interface 134 of FIG. 1 configured to obscure different portions of emitted streams of replicated patch elements, according to one embodiment of the present invention. As shown in FIG. 5A, sketch animation 136 includes a mask 500 and a boundary 510. The end-user may draw mask 500 using mask tool 222, and draw boundary 510 using texture outline tool 216. Mask 500 obscures replicated patch elements within the region defined by mask 500, while boundary 510 obscures replicated patch elements outside of the region defined by boundary 510, as shown in FIG. 5B.

In FIG. 5B, mask 500 causes emitted stream 280 to disappear within the region defined by mask 500, thereby causing that emitted stream to appear as steam passing behind a candle. Additionally, boundary 510 causes emitted streams 280, 282, and 284 to disappear beyond boundary 510, thereby causing those emitted streams to appear as steam dispersing into the air. To remove mask 500 or boundary 510, the end-user may use mask remove tool 232. Sketch-based interface 134 also allows the end-user to control the scale and speed of replicated patch elements within emitted streams 280, 282, and 284 as a function of distance from emitter 278, a discussed in greater detail below in conjunction with FIGS. 6A-6B.

Figure 6A:
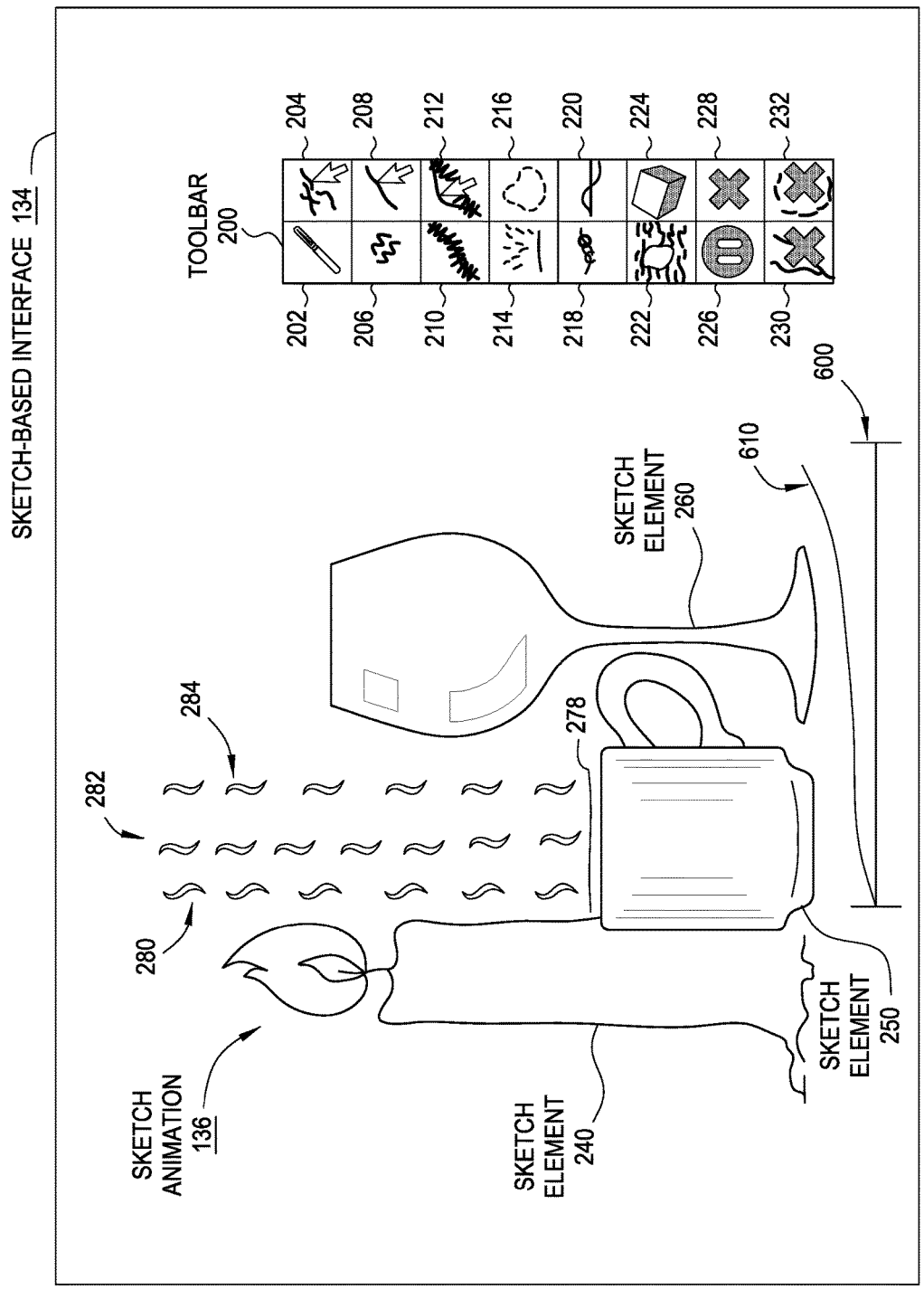
FIGS. 6A-6B illustrate the sketch-based interface of FIG. 1 configured to scale replicated patch elements within emitted streams of replicated patch elements, according to one embodiment of the present invention.
Figure 6B:
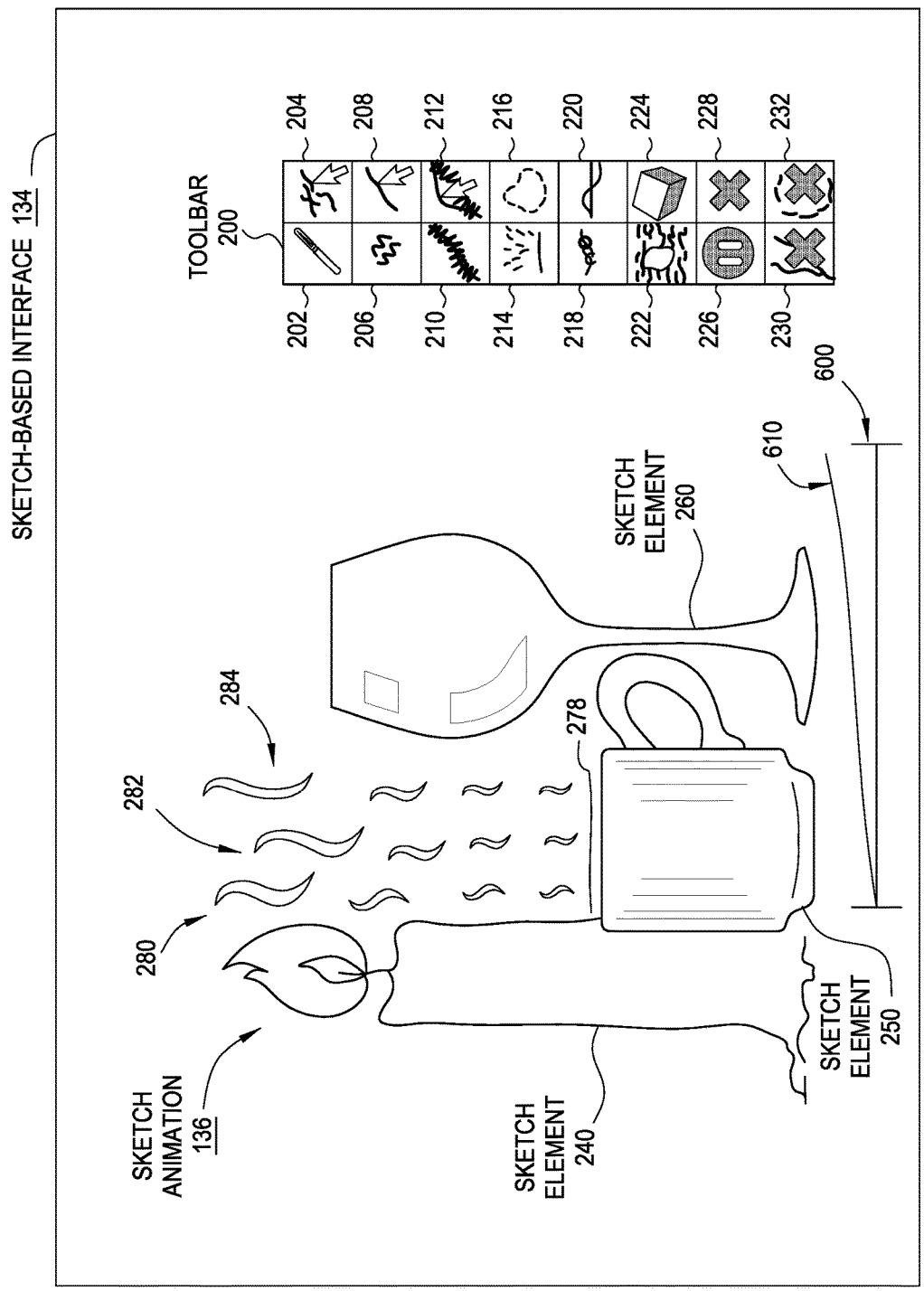

FIGS. 6A-6B illustrate sketch-based interface 134 of FIG. 1 configured to scale replicated patch elements within emitted streams of replicated patch elements, according to one embodiment of the present invention. As shown in FIG. 6A, sketch-based interface 134 is configured to display a motion profile axis 600 when the end-user selects motion profile tool 220. Motion profile axis 600 reflects linear distance from emitter 278 and includes a scale curve 610. The height of scale curve 610 represents the scale of replicated patch elements within emitted streams 280, 282, and 284 as a function of current position along the trajectory relative to emitter 278. The end-user may draw scale curve 610 on motion profile axis 600 to cause replicated patch elements of emitted streams 280, 282, and 284 to change size as those elements traverse away from emitter 278, as shown in FIG. 6B.

In FIG. 6B, replicated patch elements within emitted streams 280, 282, and 284 increase in size as those elements traverse away from emitter 278 in proportion to the height of scale curve 610 along motion profile axis 600. Motion profile axis 600 may also define other properties of emitted streams 280, 282, and 284 as a function of current position along the trajectory relative to emitter 278. For example, the end-user could draw a speed curve along motion profile axis 600 that causes replicated patch elements within emitted streams 280, 282, and 284 to change speed as a function of current position along the trajectory relative to emitter 278.

Referring generally to FIGS. 2A-6B, animation engine 132 is configured to generate emitter textures by implementing some or all of the techniques described thus far. As a general matter, an emitter texture includes a patch and an emitter, and may also include granular motion adjustments applied to replicated patch elements, motion guidelines, masks and/or boundaries that obscure the emitter texture, and scale and/or speed factors applied to replicated patch elements. With these techniques, animation engine 132 may generate sketch animation 136 without requiring the end-user to individually define each frame of that animation. The end-user may play or pause that animation via play/pause button 226. The techniques described above are also described in stepwise fashion below in conjunction with FIG. 7.

Figure 7:
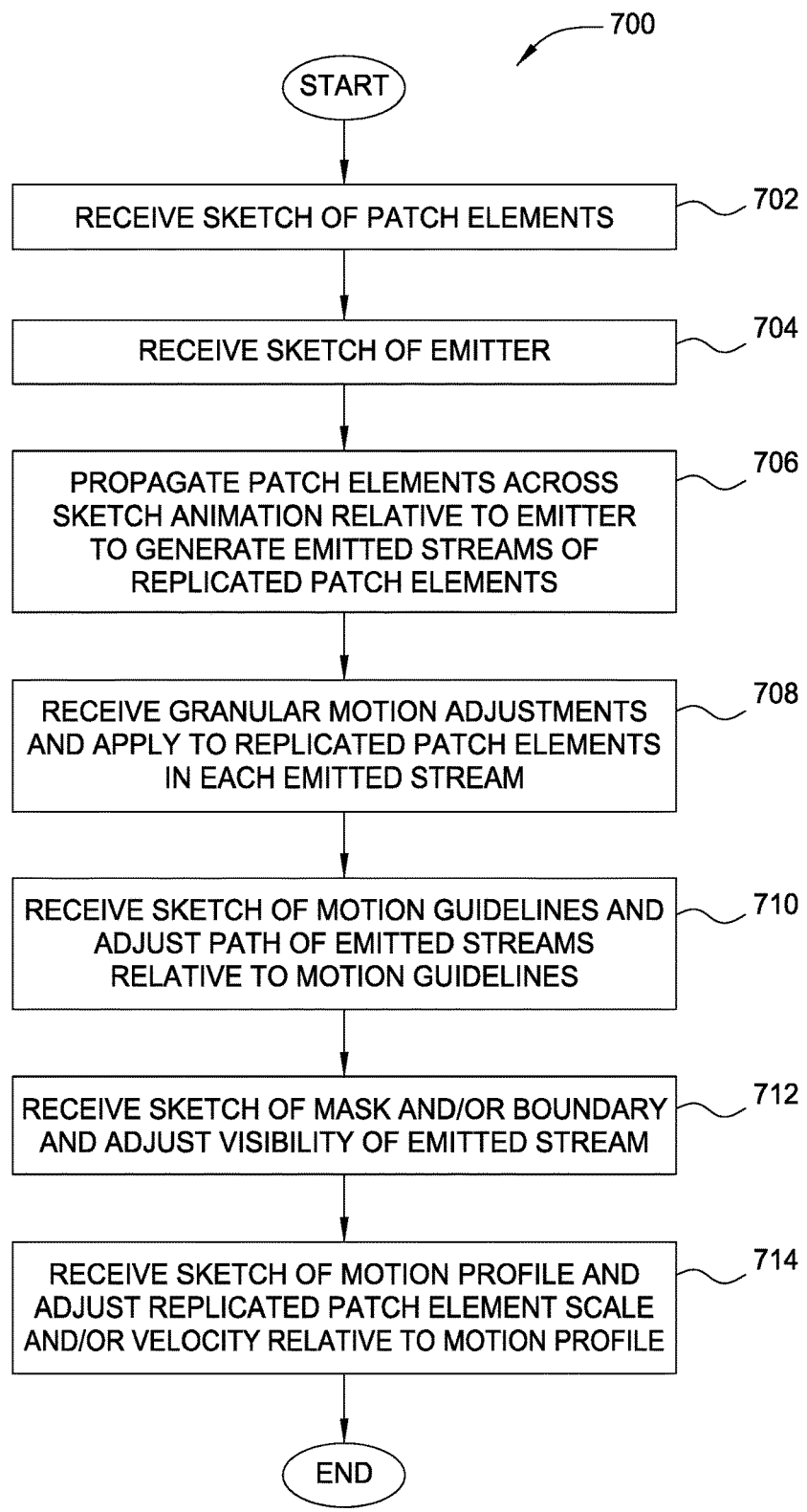
FIG. 7 is a flow diagram of method steps for generating an emitted stream of replicated patch elements within a sketch animation, according to one embodiment of the present invention.

FIG. 7 is a flow diagram of method steps for generating an emitted stream of replicated patch elements within a sketch animation, according to one embodiment of the present invention. Although the method steps are described in conjunction with the systems of FIGS. 1-6B, persons skilled in the art will understand that any system configured to perform the method steps, in any order, falls within the scope of the present invention.

As shown, a method 700 begins at step 702, where sketch-based interface 134 within animation engine 132 receives a sketch of one or more patch elements. The end-user may draw the patch elements using patch element tool 206, as described above by way of example in conjunction with FIG. 2A. At step 704, sketch-based interface 134 receives a sketch of an emitter. The end-user may draw the emitter using emitter tool 206, as described above by way of example in conjunction with FIG. 2B. At step 706, animation engine 132 propagates replicated patch elements across sketch animation 136 relative to emitter 278 to generate emitted streams of replicated patch elements, as described above by way of example in FIG. 3C.

At step 708, sketch-based interface 134 receives granular motion adjustments via granular motion interface 300. The granular motion adjustments may reflect translation adjustments or rotation adjustments. Animation engine 132 then applies those adjustments to each replicated patch element within the emitted streams, as described above by way of example in conjunction with FIGS. 3A-3B.

At step 710, sketch-based interface 134 receives one or more sketches of motion guidelines. The end-user may use motion path tool 218 to draw the motion guidelines. Animation engine 132 then adjusts the path of the emitted streams relative to the motion guidelines, as described above by way of example in conjunction with FIGS. 4A-4B.

At step 712, sketch-based interface 134 receives a sketch of a mask that obscures emitted streams within the mask, and/or a sketch of a boundary that obscures emitted streams outside of the boundary. Animation engine 132 then adjusts the visibility of the emitted streams relative to the mask and/or boundaries, as described above by way of example in conjunction with FIGS. 5A-5B.

At step 714, sketch-based interface 134 receives a sketch of a motion profile that influences the scale or velocity of replicated patch elements within emitted streams as a function of distance from the emitter. The end-user may draw the motion profile using motion profile tool 220. Animation engine 134 then adjusts the scale and/or velocity of replicated patch elements within the emitted streams in proportion to the motion profile curve, as described above by way of example in conjunction with FIGS. 6A-6B. The method 700 then terminates.

Oscillator Textures

Figure 8A:
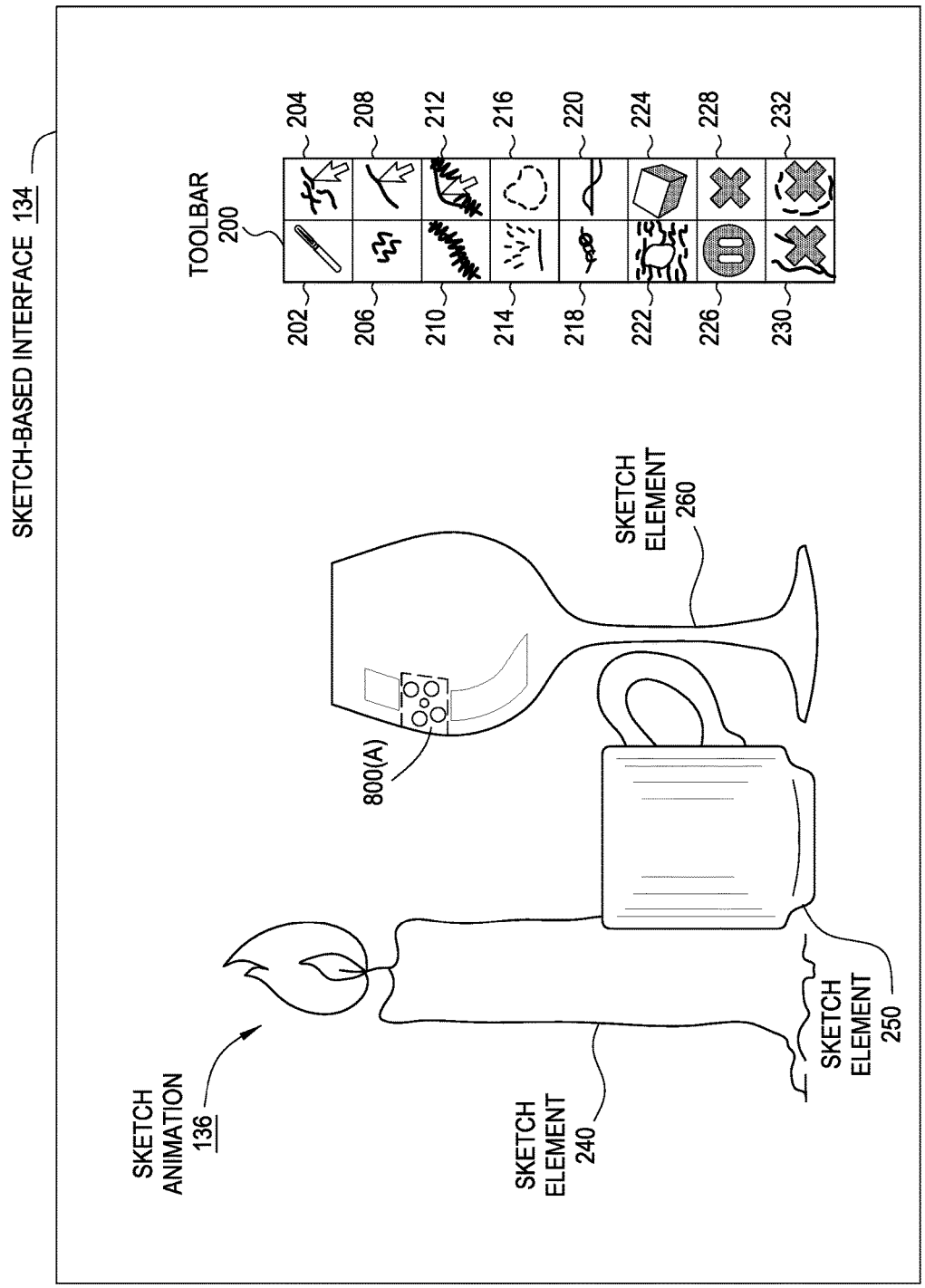
FIGS. 8A-8E illustrate the sketch-based interface of FIG. 1 configured to generate a sketch animation that includes an oscillating string of patch elements, according to one embodiment of the present invention.

FIGS. 8A-8E illustrate sketch-based interface 134 of FIG. 1 configured to generate sketch animation 136 that includes an oscillating collection of patch elements, according to one embodiment of the present invention. As shown in FIG. 8A, sketch animation 136 includes some of the same elements as described above in conjunction with FIGS. 2A-6B, including sketch elements 240, 250, and 260. In addition, sketch animation 136 includes patch 800(A), which represents bubbles floating on the surface of a liquid. The end-user may draw the patch elements within patch 800(A) using patch tool 206, in similar fashion as described above in conjunction with FIG. 2A.

Figure 8B:
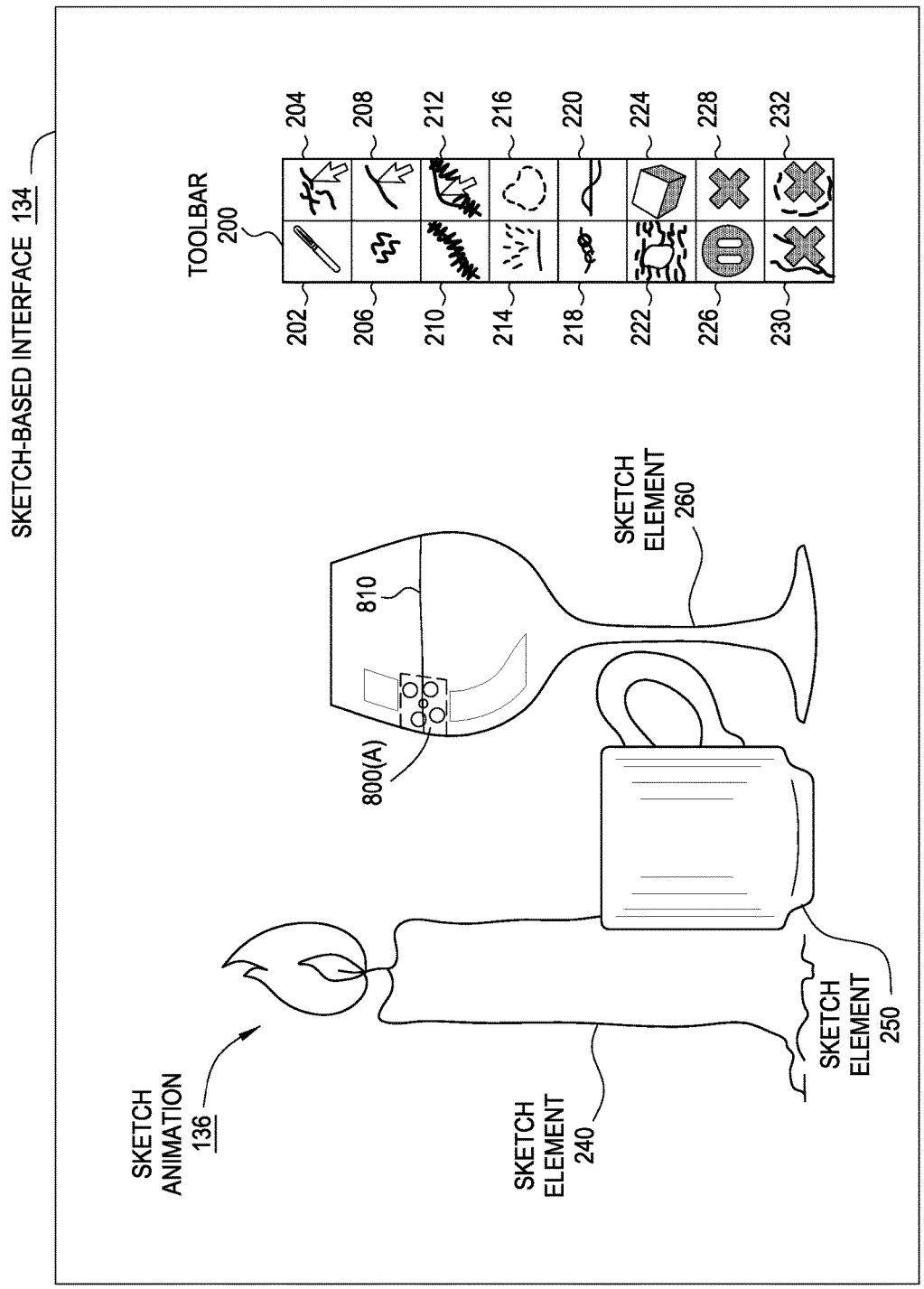
Figure 8C:
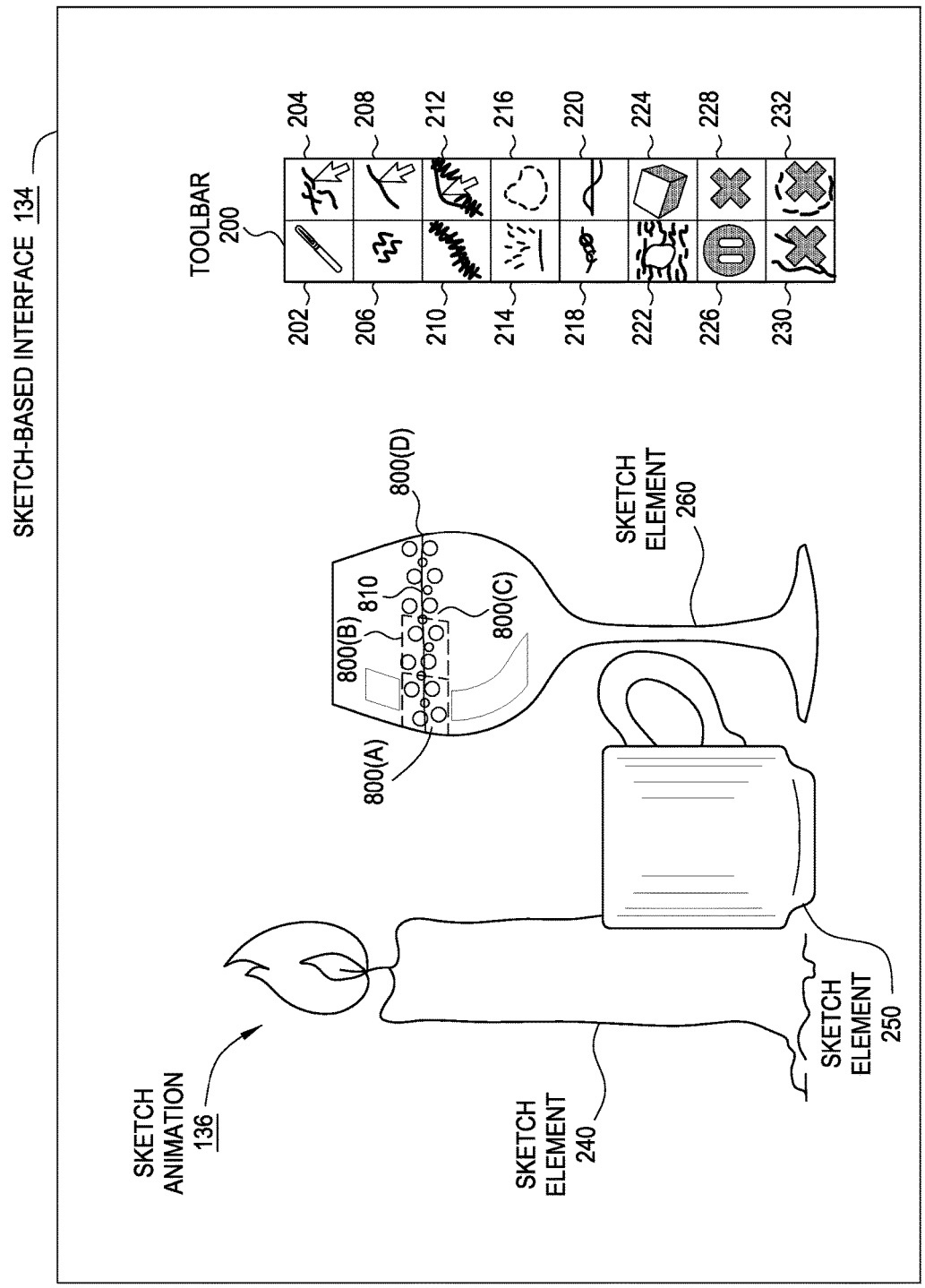

In FIG. 8B, sketch animation 136 includes a brush skeleton 810. The end-user may draw brush skeleton 810 using brush skeleton tool 210. When brush skeleton 810 is drawn proximate to patch 800(A), animation engine 132 identifies the patch elements within that patch and replicates those elements along brush skeleton 810 in a repeating pattern, as shown in FIG. 8C. In FIG. 8C, animation engine 132 replicates patch 800(A) along brush skeleton 810, thereby creating replicated patches 800(B), 800(C), and 800(D).

Figure 8D:
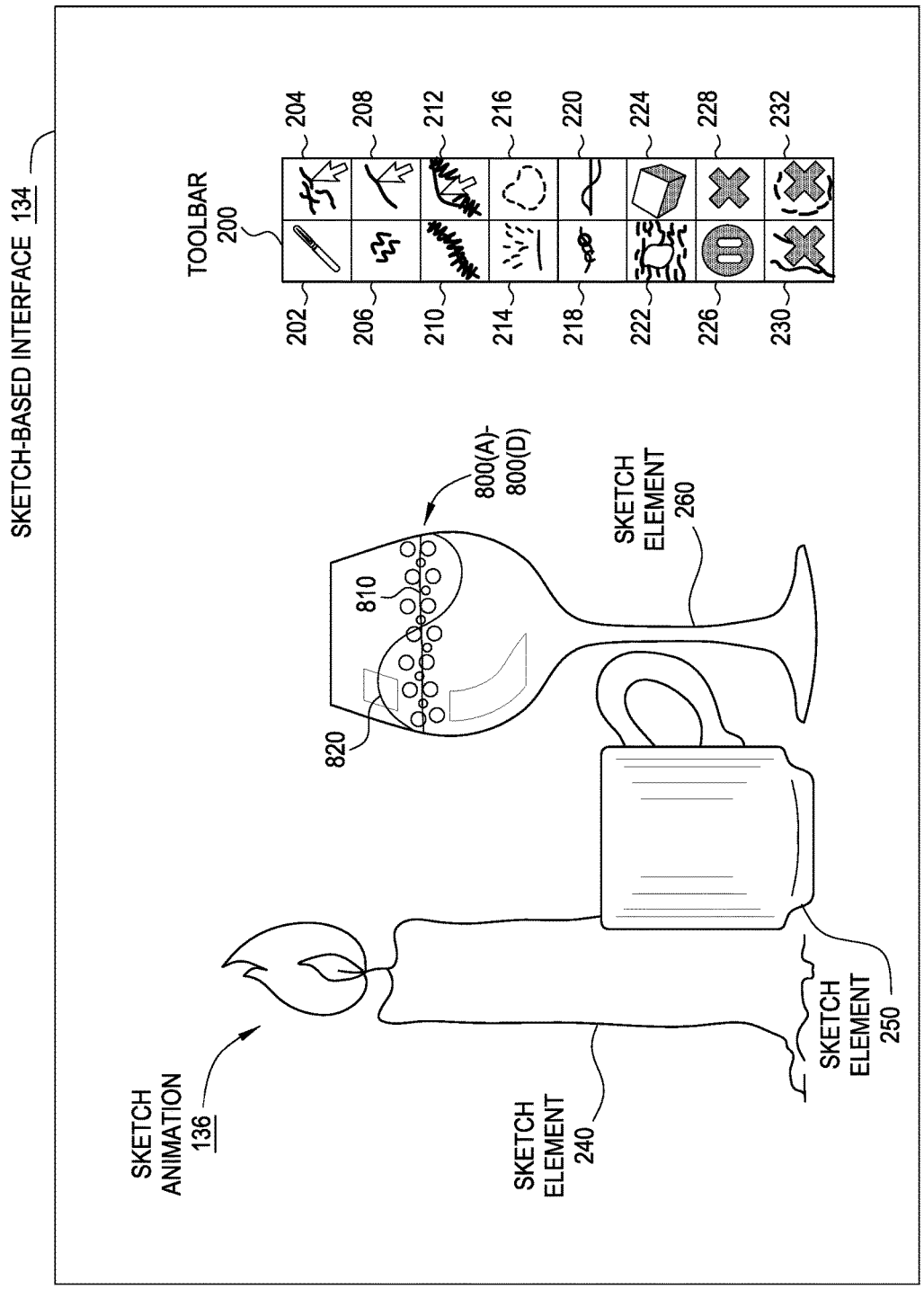

In FIG. 8D, sketch animation 136 includes an oscillation skeleton 820. The end-user may draw oscillation skeleton using oscillation skeleton tool 212. Oscillation skeleton 820 and brush skeleton 810 represent boundaries between which animation engine 132 may animate replicated patches 800(A)-800(D).

Figure 8E:
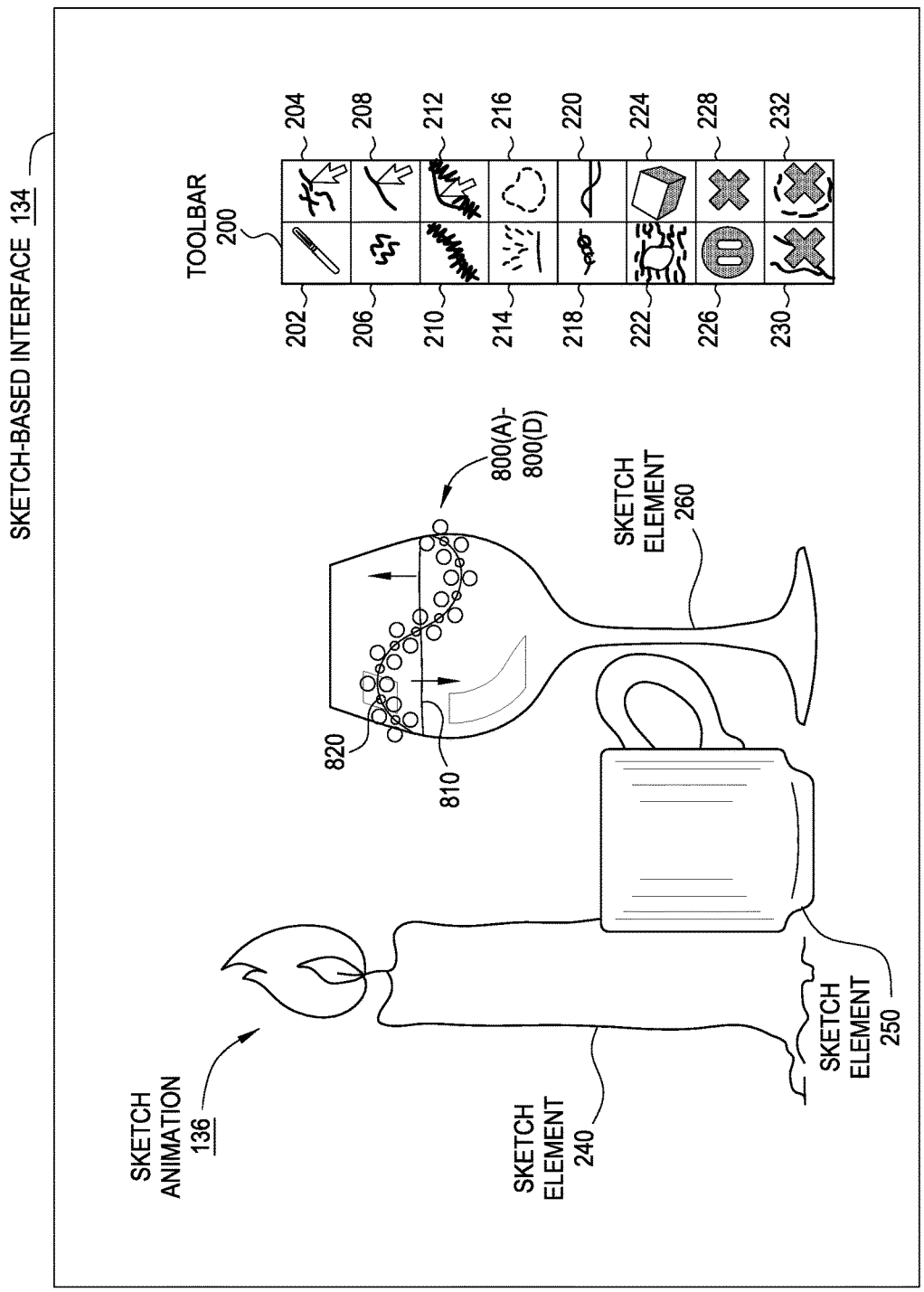

Specifically, in FIG. 8E, animation engine 132 causes replicated patch elements 800(A)-800(D) to oscillate between brush skeleton 810 and oscillation skeleton 820 in a periodic fashion. In doing so, animation engine 132 may interpolate each individual patch 800(A), 800(B), 800(C), and 800(D) to cause those patches to appear to move smoothly from brush skeleton 810 to oscillation skeleton 820, and then back to brush skeleton 810, repeatedly. Accordingly, patches 800(A)-800(D) may appear to represent bubbles on the surface of a liquid that is gently sloshing within a glass.

In the example described in conjunction with FIG. 8E, oscillation skeleton 820 crosses brush skeleton 810, thereby defining multiple regions between which patches 800(A)-800(D) oscillate. For example, patch 800(A) oscillates within a first region residing to the left of the point where oscillation skeleton 820 crosses brush skeleton 810, while patch 800(D) oscillates within a second region residing to the right of that crossing point. As a result of this arrangement, patch 800(A), and other patches within the first region, generally oscillates with a different phase compared to patch 800(D) and other patches within the second region.

Specifically, when patch 800(A) oscillates downwards, as shown in FIG. 8E, patch 800(D) oscillates upwards, and vice versa. Persons skilled in the art will understand that brush skeleton 810 may cross oscillation skeleton 820 at many different points, thereby defining a corresponding number of different regions with potentially different phases. Additionally, brush skeleton 810 need not cross oscillation skeleton 820, thereby defining only a single region within which patches 800(A)-800(D) oscillate with substantially the same phase.

In similar fashion as described above in conjunction with FIGS. 3A-3B, the end-user may adjust the granular motion of each bubble within patches 800(A)-800(D), as described in greater detail below in conjunction with FIG. 9.

Figure 9:
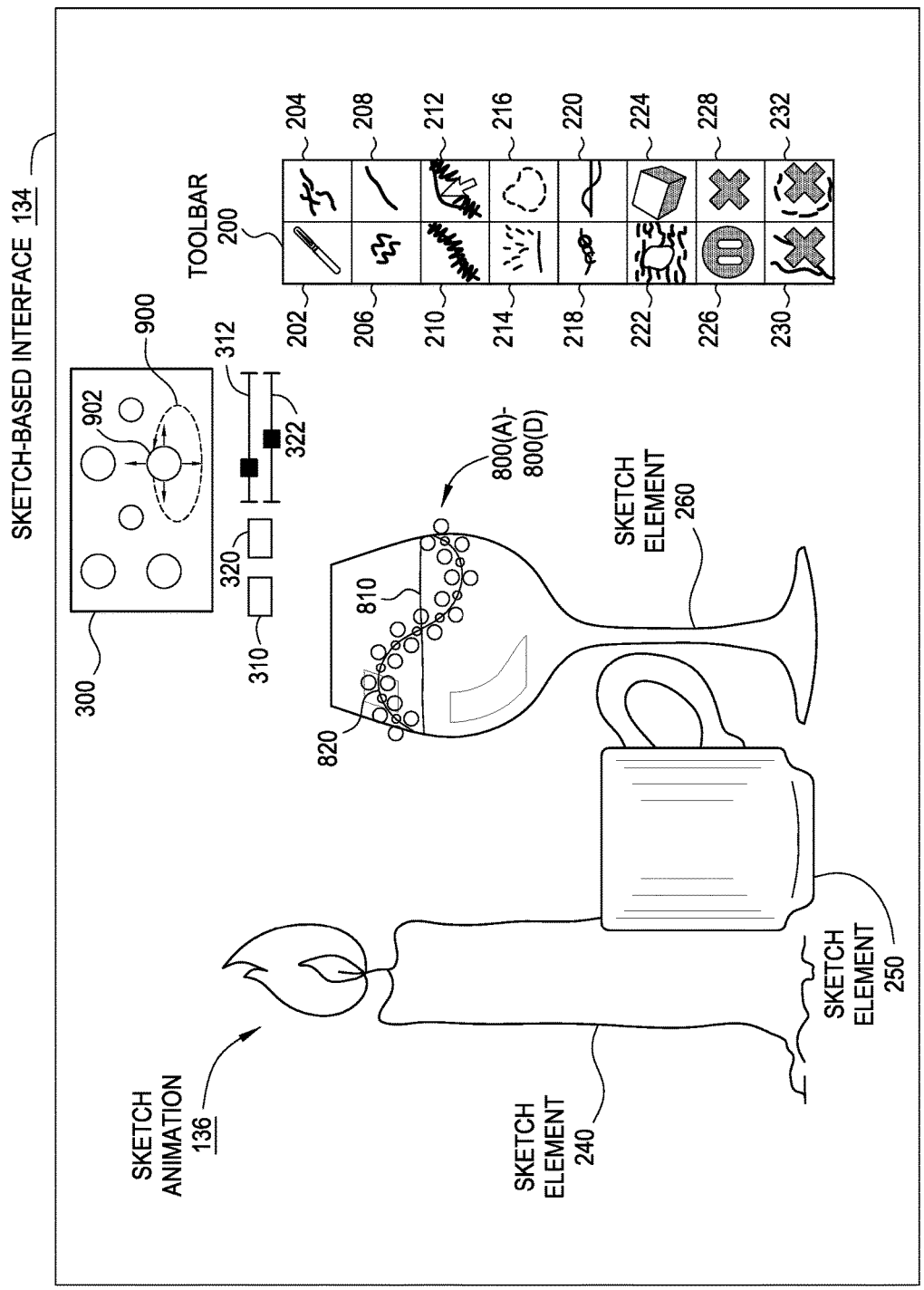
FIG. 9 illustrates the sketch-based interface of FIG. 1 configured to adjust the granular motion of replicated patch elements within an oscillating string of patches, according to one embodiment of the present invention.

FIG. 9 illustrates sketch-based interface 134 of FIG. 1, configured to adjust the granular motion of patch elements within an oscillating collection of patch elements, according to one embodiment of the present invention. As shown, sketch-based interface 134 is configured to display granular motion interface 300, which includes an expanded version of patch 800(A). In like fashion as described above in conjunction with FIG. 3A-3B, the end-user may adjust the translation and/or rotation of the patch elements of patch 800(A), as well as that associated with patch elements 800(B)-800(D). In doing so, the end-user may select translation mode button 310 and then drag individual patch elements shown in granular motion interface 300. Animation engine records the path of dragging and then causes each patch element within patch elements 800(A)-800(D) to follow the same path during animation.

For example, animation engine could record path 900 traced when the end-user drags patch element 902, and then animate the patch elements within patches 800(A)-800(D) during animation. Granular motion interface 300 also allows the end-user to adjust the rotation of each patch element via rotation mode button 320 and rotation speed slider 322, in similar fashion as described above in conjunction with FIG. 3B, although this functionality is not shown in FIG. 9.

Figure 10:
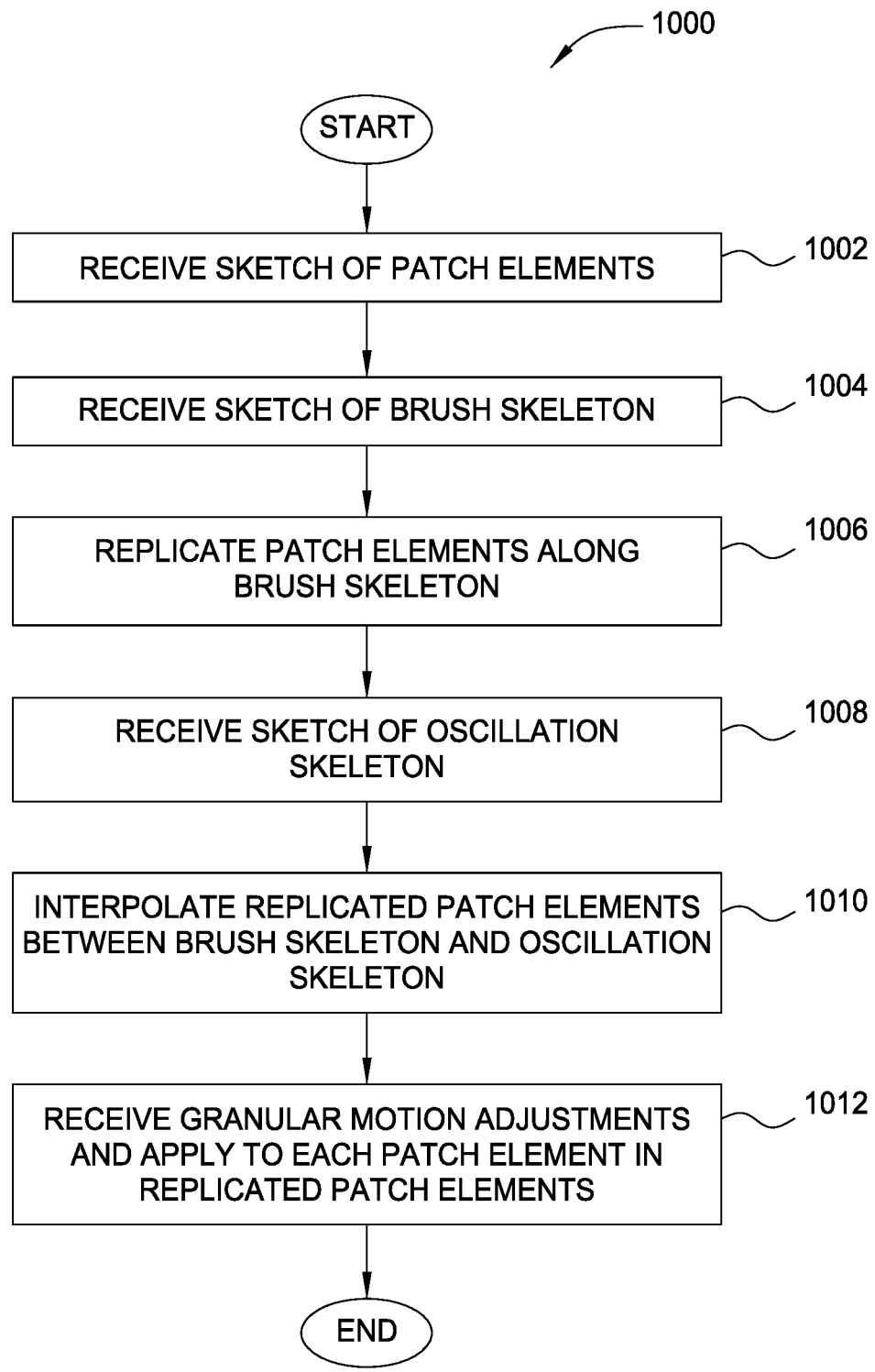
FIG. 10 is a flow diagram of method steps for generating an oscillating string of patch elements within a sketch animation, according to one embodiment of the present invention.

FIG. 10 is a flow diagram of method steps for generating an oscillating string of patch elements via an oscillator texture, according to one embodiment of the present invention. Although the method steps are described in conjunction with the systems of FIG. 1 and FIGS. 8A-9, persons skilled in the art will understand that any system configured to perform the method steps, in any order, falls within the scope of the present invention.

As shown, a method 1000 begins at step 1002, where sketch-based interface 134 within animation engine 132 receives a sketch of one or more patch elements. The end-user may draw the patch elements using patch element tool 206, as described above by way of example in conjunction with FIG. 8A. At step 1004, sketch-based interface 134 receives a sketch of a brush skeleton. The end-user may draw the brush skeleton using brush skeleton tool 210, as described above by way of example in conjunction with FIG. 8B. At step 1006, animation engine 132 replicates patches along the brush skeleton to create a string of patch elements, as described above by way of example in FIG. 8C. At step 1008, sketch-based interface 134 receives a sketch of an oscillation skeleton. The end-user may draw the oscillation skeleton using oscillation skeleton tool 212, as described above by way of example in conjunction with FIG. 8D.

At step 1010, animation engine 132 interpolates replicated patches between the brush skeleton and the oscillation skeleton to animate oscillation of those patches. An example of this animation is described above by way of example in conjunction with FIG. 8E. At step 1012, sketch-based interface 134 receives granular motion adjustments via a granular motion interface. The granular motion adjustments may reflect translation adjustments or rotation adjustments. Animation engine 132 then applies those adjustments to each patch element within the string of replicated patches, as described above by way of example in conjunction with FIG. 9. The method 900 then terminates.

In sum, a sketch-based interface within an animation engine provides an end-user with tools for creating emitter textures and oscillator textures. The end-user may create an emitter texture by sketching one or more patch elements and then sketching an emitter. The animation engine animates the sketch by generating a stream of patch elements that emanate from the emitter. The end-user may create an oscillator texture by sketching a patch that includes one or more patch elements, and then sketching a brush skeleton and an oscillation skeleton. The animation engine replicates the patch along the brush skeleton, and then interpolates the replicated patches between the brush skeleton and the oscillation skeleton, thereby causing those replicated patches to periodically oscillate between the two skeletons.

At least one advantage of the present invention is that the end-user may create sketch animations without having to draw each individual frame of the animation. Accordingly, the sketch-based interface described herein facilitates faster generation of sketch animations. In addition, the disclosed techniques rely on a sketch-based interface that may not need an explicit timeline, which may be more intuitive than conventional simulation programs.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method, comprising:
propagating a plurality of replicated sketch elements across a sketch animation relative to an emitter element to generate at least one emitted stream of replicated sketch elements within the sketch animation, wherein each replicated sketch element is based on a first sketch element;
causing one or more of the replicated sketch elements within the at least one emitted stream of replicated sketch elements to move from a first position relative to the emitter element within the sketch animation to a second position relative to the emitter element within the sketch animation, thereby causing the one or more replicated sketch element to traverse a first portion of the sketch animation; and
rendering the sketch animation for display as the one or more replicated sketch elements traverse the first portion of the sketch animation.

2. The computer-implemented method of claim 1, further comprising setting a cohesion value associated with a first replicated sketch element, wherein the cohesion value reflects a degree to which the first replicated sketch element follows a first trajectory when traversing the first portion of the sketch animation.

3. The computer-implemented method of claim 1, further comprising setting a speed value associated with a first replicated sketch element, wherein the speed value reflects a speed with which the first replicated sketch element traverses the first portion of the sketch animation.

4. The computer-implemented method of claim 1, further comprising:
generating a first motion guideline within the sketch animation; and
based on the first motion guideline, adjusting a default trajectory that a first replicated sketch element is configured to follow when traversing the first portion of the sketch animation.

5. The computer-implemented method of claim 1, further comprising:
generating a first mask region within the sketch animation; and
obscuring the first sketch element as a first replicated sketch element traverses the first mask region within the sketch.

6. The computer-implemented method of claim 1, further comprising:
generating a first boundary region within the sketch animation; and
obscuring a first replicated sketch element when the first replicated sketch element passes beyond the first boundary region within the sketch animation.

7. The computer-implemented method of claim 1, further comprising:
generating a first motion profile curve that reflects the distance between a first replicated sketch element and the emitter element;
evaluating the first motion profile curve based on a first distance between the first replicated sketch element and the emitter element to determine a value for a scale factor; and
adjusting the size of the first replicated sketch element based on the value of the scale factor.

8. The computer-implemented method of claim 1, further comprising:
generating a first motion profile curve that reflects the distance between a first replicated sketch element and the emitter element;
evaluating the first motion profile curve based on a current position of the first replicated sketch element relative to the emitter element to determine a value for a speed factor; and
adjusting the speed of the first replicated sketch element based on the value of the speed factor.

9. The computer-implemented method of claim 1, further comprising:
determining a curvilinear translation of a first replicated sketch element along a first path; and
causing the first replicated sketch element to move according to the curvilinear translation while the first replicated sketch element traverses the first portion of the sketch animation, thereby causing the first replicated sketch element to traverse the first path.

10. The computer-implemented method of claim 1, further comprising:
determining an angular rotation of a first replicated sketch element across a first angle; and
causing the first replicated sketch element to rotate according to the angular rotation while the first replicated sketch element traverses the first portion of the sketch animation, thereby causing the first replicated sketch element to traverse the first angle.

11. A non-transitory computer-readable medium storing instructions that, when executed by a processor, cause the processor to perform the steps of:
propagating a plurality of replicated sketch elements across a sketch animation relative to an emitter element to generate at least one emitted stream of replicated sketch elements within the sketch animation, wherein each replicated sketch element is based on a first sketch element;
causing one or more of the replicated sketch elements within the at least one emitted stream of replicated sketch elements to move from a first position relative to the emitter element within the sketch animation to a second position relative to the emitter element within the sketch animation, thereby causing the one or more replicated sketch element to traverse a first portion of the sketch animation; and
rendering the sketch animation for display as the one or more replicated sketch elements traverse the first portion of the sketch animation.

12. The non-transitory computer-readable medium of claim 11, further comprising setting a cohesion value associated with a first replicated sketch element, wherein the cohesion value reflects a degree to which the first replicated sketch element follows a first trajectory when traversing the first portion of the sketch animation.

13. The non-transitory computer-readable medium of claim 11, further comprising setting a speed value associated with a first replicated sketch element, wherein the speed value reflects a speed with which the first replicated sketch element traverses the first portion of the sketch animation.

14. The non-transitory computer-readable medium of claim 11, further comprising:
generating a first motion guideline within the sketch animation; and
based on the first motion guideline, adjusting a default trajectory that a first replicated sketch element is configured to follow when traversing the first portion of the sketch animation.

15. The non-transitory computer-readable medium of claim 11, further comprising:
generating a first mask region within the sketch animation; and
obscuring the first sketch element as a first replicated sketch element traverses the first mask region within the sketch.

16. The non-transitory computer-readable medium of claim 11, further comprising:
generating a first boundary region within the sketch animation; and
obscuring a first replicated sketch element when the first replicated sketch element passes beyond the first boundary region within the sketch animation.

17. The non-transitory computer-readable medium of claim 11, further comprising:
generating a first motion profile curve that reflects the distance between a first replicated sketch element and the emitter element;
evaluating the first motion profile curve based on a first distance between the first replicated sketch element and the emitter element to determine a value for a scale factor; and
adjusting the size of the first replicated sketch element based on the value of the scale factor.

18. The non-transitory computer-readable medium of claim 11, further comprising:

generating a first motion profile curve that reflects the distance between a first replicated sketch element and the emitter element;

evaluating the first motion profile curve based on a current position of the first replicated sketch element relative to the emitter element to determine a value for a speed factor; and adjusting the speed of the first replicated sketch element based on the value of the speed factor.

19. The non-transitory computer-readable medium of claim 11, further comprising:

determining a curvilinear translation of a first replicated sketch element along a first path; and causing the first replicated sketch element to move according to the curvilinear translation while the first replicated sketch element traverses the first portion of the sketch animation, thereby causing the first replicated sketch element to traverse the first path.

20. The non-transitory computer-readable medium of claim 11, further comprising:

determining an angular rotation of a first replicated sketch element across a first angle; and causing the first replicated sketch element to rotate according to the angular rotation while the first replicated sketch element traverses the first portion of the sketch animation, thereby causing the first replicated sketch element to traverse the first angle.

21. A system, comprising:

a memory storing instructions;

a processor that is coupled to the memory and, when executing the instructions, is configured to perform the steps of:

propagating a plurality of replicated sketch elements across a sketch animation relative to an emitter element to generate at least one emitted stream of replicated sketch elements within the sketch animation, wherein each replicated sketch element is based on a first sketch element;

causing one or more of the replicated sketch elements within the at least one emitted stream of replicated sketch elements to move from a first position relative to the emitter element within the sketch animation to a second position relative to the emitter element within the sketch animation, thereby causing the one or more replicated sketch element to traverse a first portion of the sketch animation; and rendering the sketch animation for display as the one or more replicated sketch elements traverse the first portion of the sketch animation.

* * * * *